(12) United States Patent
Okamoto et al.

(10) Patent No.: US 8,152,317 B2
(45) Date of Patent: Apr. 10, 2012

(54) LIGHT SOURCE DEVICE, LIGHTING DEVICE AND IMAGE DISPLAY DEVICE

(75) Inventors: Naoya Okamoto, Kanagawa-ken (JP); Ryosuke Nakagoshi, Kanagawa-ken (JP); Ryusaku Takahashi, Kanagawa-ken (JP); Takatsugu Aizaki, Kanagawa-ken (JP); Tadashi Furukawa, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 613 days.

(21) Appl. No.: 12/318,295

(22) Filed: Dec. 24, 2008

(65) Prior Publication Data
US 2009/0168450 A1    Jul. 2, 2009

(30) Foreign Application Priority Data

Dec. 26, 2007 (JP) ................................. 2007-334672
Oct. 23, 2008 (JP) ................................. 2008-273655
Oct. 23, 2008 (JP) ................................. 2008-273656

(51) Int. Cl.
*F21V 9/14* (2006.01)

(52) U.S. Cl. ........................ 362/19; 362/268; 362/628
(58) Field of Classification Search .................... 362/19, 362/259, 268, 609, 628; 353/8, 33, 81; 359/489.08
See application file for complete search history.

(56) References Cited

U.S. PATENT DOCUMENTS

| 7,031,066 | B2 * | 4/2006 | Kang et al. ............... 359/489.08 |
| 7,513,669 | B2 * | 4/2009 | Chua et al. .................... 362/609 |
| 7,537,352 | B2 * | 5/2009 | Chen ............................. 362/551 |
| 7,543,945 | B2 * | 6/2009 | Lee et al. ........................ 362/19 |
| 2006/0044523 | A1 * | 3/2006 | Teijido et al. ................... 353/81 |
| 2006/0262514 | A1 * | 11/2006 | Conner et al. .................. 362/19 |

FOREIGN PATENT DOCUMENTS

JP          07-066455          3/1995

\* cited by examiner

*Primary Examiner* — Y My Quach Lee
(74) *Attorney, Agent, or Firm* — The Nath Law Group; Jerald L. Meyer; Robert T. Burns

(57) ABSTRACT

A light source device includes an optical element 22 having a first face 1 opposed to a solid light emitting element 21. The optical element 22 includes second and third faces 2, 3 opposing in parallel to each other and both substantially perpendicular to the first face 1, a fourth face 4 substantially perpendicular to the second and third faces 2, 3 and also obliquely-opposed to the first face 1 and a fifth face 5 as an exit face. The fifth face 5 has an area smaller than an area of a light emitting face of the solid light emitting element 21. The light source device further includes a polarization converting element 42 having an incident surface opposing in substantially-parallel to the fifth face 5 through a space, polarization separating elements 43 for separating incident light from the optical element 22 in polarization, a first reflecting surface 45 for reflecting one of polarization-separated fluxes and wave plates 44 for converting either of phases of the polarization-separated fluxes.

31 Claims, 21 Drawing Sheets

$\theta > \theta'$
$S < S'$
$S * \sin\theta = S' * \sin\theta'$

LIGHT SOURCE DEVICE, LIGHTING DEVICE AND IMAGE DISPLAY DEVICE

BACKGROUND OF THE INVENTION

1. Field of the Invention

The present invention relates to a light source or lighting device for illuminating a spatial light modulating element and further relates to an image display device having such a light source device.

2. Description of Related Art

There has been conventionally proposed an image display device having a spatial light modulating element and illuminating it by means of a light source device thereby to display an image by modulated lights transmitted through the spatial light modulating element. In this light display device, the spatial light modulating element displays a display image, while illumination light is modulated in accordance with the display image. The modulated light modulated by the spatial light modulating element forms an image through an imaging optics, for example, an image displayed on a screen.

As a light source device for the image display device, Japanese Patent Publication Laid-open No. 7-66455 discloses a light source device using a solid light-emitting element as a light source. As for the solid light-emitting element, there are light-emitting diode (LED), semiconductor laser diode (LD), electroluminescence element (EL) and so on.

In addition, as shown in FIGS. 1 and 2, there are known light source device each of which includes an integrator optical system for illuminating a spatial light modulating element uniformly. This integrator optical system is provided to homogenize the luminance distribution of illumination light emitted from the light source.

In the "fly-eye lens" integrator optical system of FIG. 1, the luminance distribution of illumination light for illuminating a spatial light modulating element 103 is homogenized since the illumination light is transmitted through fly-eye lenses 101, 102 each having a plurality of small lenses arranged therein.

Further, in the "rod" integrator optical system of FIG. 2, the luminance distribution of illumination light is homogenized since the illumination light is transmitted through a prismatic-shaped rod 104 repeating internal reflections. That is, in this rod integrator optical system, an image is formed on one end face (i.e. incident surface) of the rod 104. Instead, the light source 105 is attached firmly to the end face of the rod 104. In operation, light emitted from the light source 105 is propagated in the rod 104 while making internal reflections (total reflection) in the rod 104, and subsequently emitted to an outside through the other end face (or an exit end face) of the rod 104. By producing an image of the exit end face of the rod 104 on the spatial light modulating element 103 as an object to be illuminated, illumination light can be provided with a uniform luminance distribution advantageously.

SUMMARY OF THE INVENTION

In the image display device mentioned above, it is desired to illuminate a spatial light modulating element at higher luminance thereby to accomplish an image displaying with high luminance. In this view, it is contemplated to increase an output of a light source. However, as the increasing of the output of the light source is accompanied with an increase in power consumption and calorific value and large-sized installation, it is required to improve the light use efficiency of light from the light source without increasing the output thereby to illuminate the spatial light modulating element with high luminance.

In optics, meanwhile, there is known "the equation describing Helmholtz-Lagrange invariants":

$$Nuy = N'u'y'$$

where N and N' are refractive indexes; u and u' are angles of light rays; and y and y' are image heights. This relationship is always established between two areas interposing an optical surface (e.g. lens) therebetween.

Further, if describing the image heights (heights of object) y, y' as an area (S) and the light rays' angles u, u' as a solid angle (θ), then the above relationship can be grasped as "relationship of etendue (E'tendue)" and further restated that respective "etendue" values are unchangeable in two zones interposing the optical surface therebetween. The etendue E is represented by $$E = \pi S \sin^2 \theta.$$

This relationship is invariant through a plurality of optical systems and is applicable to a relationship between an object and its image. Accordingly, the above relationship is established in between an illumination light source and an object to be illuminated (e.g. the spatial light modulating element), and further established in the above-mentioned light source device, as well.

In the rod-integrator optical system using the prismatic rod 104 (see FIG. 2), for instance, an irradiation angle of light rays (light beams) from the exit end face of the rod 104 is equal to an irradiation angle of light rays from the light source 105, so that the equation of "Helmholtz-Lagrange invariants" is satisfied. In addition, as the equation of "Helmholtz-Lagrange invariants" is satisfied in the shown imaging optics producing the image of the exit end face of the rod 104, the equation of "Helmholtz-Lagrange invariants" is established in the whole illumination optical system.

If the specification (i.e. an image height y' and a light beam angle u') of the illumination optical system is sufficiently large in comparison with the specification (an object height y and irradiation angle u) of the light source, and the following relationship:

$$Nuy < N'u'y'$$

is established, it means that almost all of light beams emitted from the light source can be taken into the illumination optical system.

Also in the fly-eye lens integrator optical system, the equation of "Helmholtz-Lagrange invariants" is established, as well.

In this way, the use efficiency of light from the light source in the light source device is determined by the etendue as a function between a light emitting area of the light source and an irradiation angle of light beams emitted from the light source. In other words, the use efficiency of light from a surface light source having finite dimensions (size) is determined by the light emitting area of the light source and the irradiation angle, uniquely.

In order to illuminate an object to be illuminated, such as a spatial light modulating element, with higher luminance, therefore, it is necessary to either increase the quantity of emission light per unit area of the light source or reduce the irradiation angle of light beams from the light source. However, these measures are commonly directed to an improvement in the performance of the light source, and not directed to an improvement in the light use efficiency of the light source.

As the illumination optical system directed to the improvement in the light use efficiency of the light source, incidentally, there are proposed integrator optical systems each adopting a tapered rod (or light pipe), which are illustrated in FIGS. 3 and 4. In the integrator optical system equipped with one tapered light pipe 104 having a fifth face (i.e. its exit face on the right side) larger than the light source 105, as shown in FIG. 3, the light beams' emission angle θ' becomes smaller since the equation of "Helmholtz-Lagrange invariants" is established. On the contrary, in the other integrator optical system equipped another tapered light pipe 105 having a fifth face smaller than the light source 105, as shown in FIG. 4, the light beams' emission angle θ' becomes larger since the equation of "Helmholtz-Lagrange invariants" is established. In common with these integrator optical systems, there is no change in respective values of etendue. That is, it should be said that the light use efficiency of light from the light source is not improved in these integrator optical systems.

In addition, there is proposed a light source device including light emitting diodes (LED) as a light source and a light pipe for introducing light from the light source, which is adapted so as to return unnecessary polarized light inside the light pipe to the light source and subsequently rotate so-returned light (reflection light) LED at 90 degrees by a retardation plate. This light source device is directed to an improvement in the light use efficiency (i.e. improvement of etendue) in addition to the task of a polarization changer. However, since the same device is based on the assumption of completing the polarization change, it is impossible to change the value of etendue to an optional value for improvement.

Under the above-mentioned situation, an object of the present invention is to provide a light source device which improves the light use efficiency of a light source and the etendue thereby illuminating an illuminated object, such as a spatial light modulating element, at higher luminance without increasing the quantity of emission light per unit area of the light source and without reducing the irradiation angle of light beams from the light source. Furthermore, another object of the present invention is to provide an image display device using the light source device.

In order to achieve the above objects, according to the first aspect of the present invention, there is provided a light source device comprising: a solid light emitting element provided as a surface emitting source, the solid light emitting element having a reflecting film arranged on the back side of the solid light emitting element and a light emitting face arranged on the front side of the solid light emitting element; an optical element having a first face opposed to the light emitting face of the solid light emitting element through a gap, second and third faces opposing in parallel to each other and both substantially perpendicular to the first face, a fourth face substantially perpendicular to the second and third faces and also obliquely-opposed to the first face and a fifth face having a rim formed by respective one side edges of the first to fourth faces the optical element defining a polyhedron surrounded by the first to fifth faces and also filled up with a medium having a refractive index more than a refractive index of a circumferential medium surrounding the optical element; and a polarization converting element having an incident surface opposing in substantially-parallel to the fifth face through a space whose refractive index is equal to or less than the refractive index of the medium forming the optical element, the polarization converting element comprising a polarization separating element for polarization-separating flux entering from the optical element to the incident surface, a first reflecting surface for reflecting one of fluxes separated in polarization and a wave plate for converting either of phases of the fluxes separated in polarization, wherein: the fifth face of the optical element is formed with an area smaller than an area of the light emitting face, whereby light generated from the solid light emitting element enters the optical element through the first face, and is emitted to an outside through the fifth face and subsequently, the light enters the enters the polarization converting element where the polarization of the light is converted and combined.

According to the second aspect of the present invention, there is also provided a light source device comprising: a solid light emitting element provided as a surface emitting source, the solid light emitting element having a reflecting film arranged on the back side of the solid light emitting element and a light emitting face arranged on the front side of the solid light emitting element; an optical element having a first face opposed to the light emitting face of the solid light emitting element through a gap, second and third faces opposing in parallel to each other and both substantially perpendicular to the first face, a fourth face substantially perpendicular to the second and third faces and also obliquely-opposed to the first face, a fifth face having a rim formed by respective one side edges of the first to fourth faces the optical element defining a polyhedron surrounded by the first to fifth faces and also filled up with a medium having a refractive index more than a refractive index of a circumferential medium surrounding the optical element; and lumen compression means for shifting respective beams' positions of two fluxes emitted from the optical element while maintaining the directions of the fluxes thereby to moving the fluxes closer to each other, wherein: the fifth face of the optical element is formed with an area smaller than an area of the light emitting face, whereby light generated from the solid light emitting element enters the optical element through the first face and is emitted to an outside through the fifth face, in the form of the two fluxes, and subsequently, the light enters the enters the lumen compression means where the two fluxes is combined into one flux.

In connection with the first aspect, preferably, the light source device further comprises a light pipe made from a medium whose refractive index is more than that of the medium filling the inside of the optical element, wherein the light pipe is arranged in succession to the filling face of the optical element integrally, the light pipe is tapered so as to increase its diameter as departing from the optical element, and the light pipe has its leading face arranged in parallel to the fifth face to form an exit end face.

According to the third aspect of the present invention, there is also provided a lighting device comprising: a light tunnel into which flux emitted from the light pipe of the preferable light source device related to the first aspect enter, the light tunnel multiply-reflecting the flux; a collimator optical system for collimating the flux emitted from the light tunnel thereby to divide the flux into four or more fluxes; a polarization converting element for converting the four or more fluxes in polarization; and a light collection optical system for collecting the fluxes emitted from the polarization converting element thereby to form an image of an exit face of the light pipe.

According to the fourth aspect of the present invention, there is also provided an image display device comprising: the light source device of the first aspect; a spatial light modulating element illuminated by light emitted from the light source device; and an imaging optics into which the light transmitted through the spatial light modulating element enters and which forms an image of the spatial light modulating element.

DETAILED DESCRIPTION OF THE PREFERRED EMBODIMENTS

Referring to drawings, a light source device related to the present invention and an image display device using the above light source device will be described below, in terms of their constitutions.

1$^{st}$. Embodiment of Light Source Device

Figure 1:
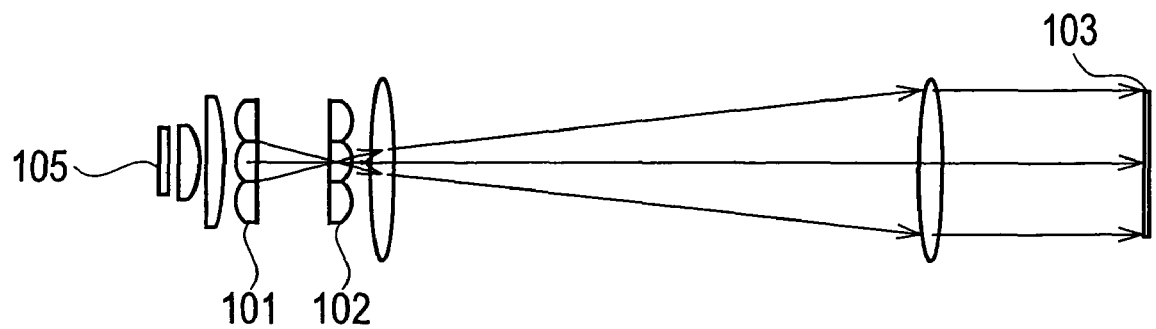
FIG. 1 is a side view showing the constitution of a first conventional light source device referred to as "fly-eye integrator"
Figure 2:
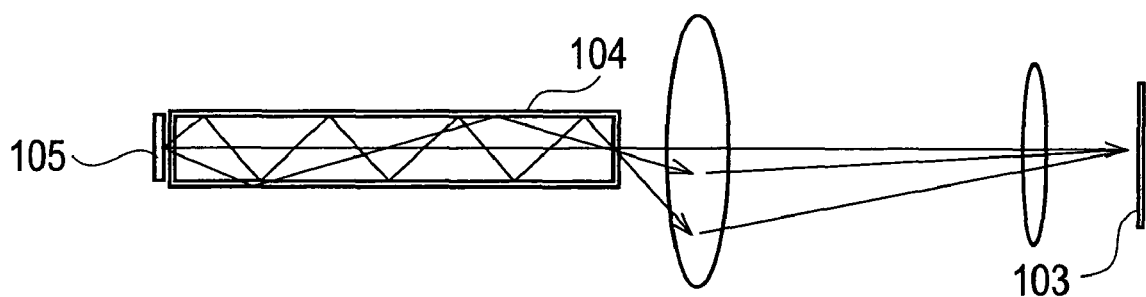
FIG. 2 is a side view showing the constitution of a second conventional light source device referred to as "rod integrator"
Figure 3:
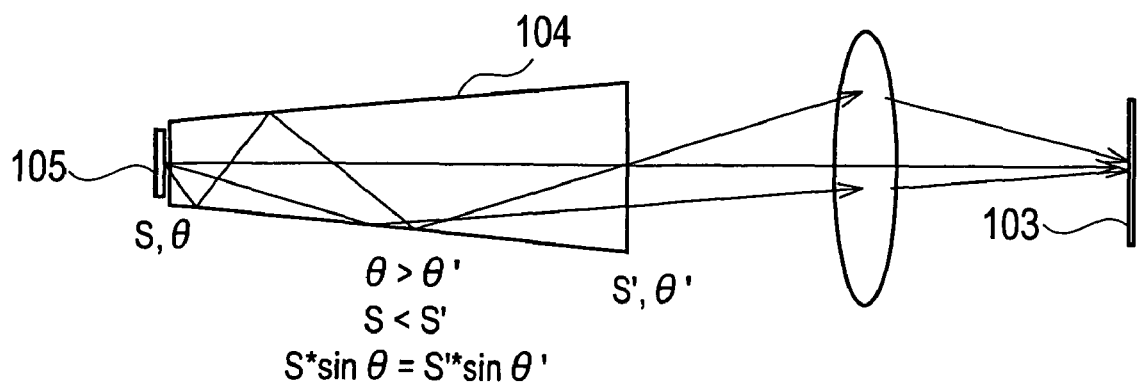
FIG. 3 is a side view showing the constitution of a third conventional light source device referred to as "expanding-tapered light pipe.
Figure 4:
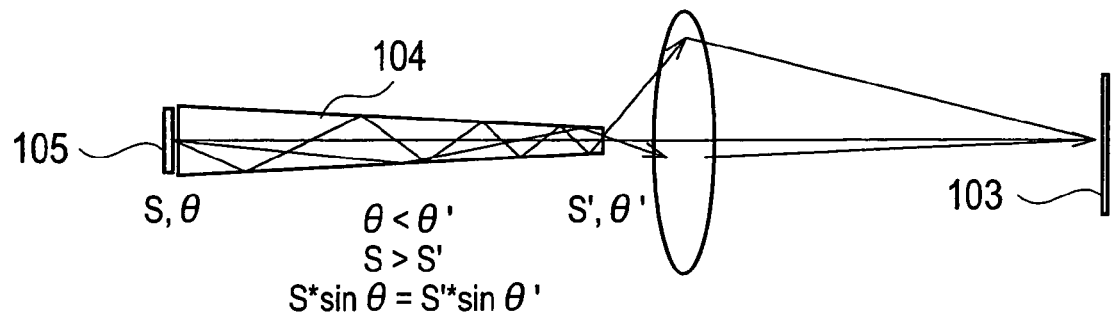
FIG. 4 is a side view showing the constitution of a fourth conventional light source device referred to as "shrinking-tapered light pipe.
Figure 5:
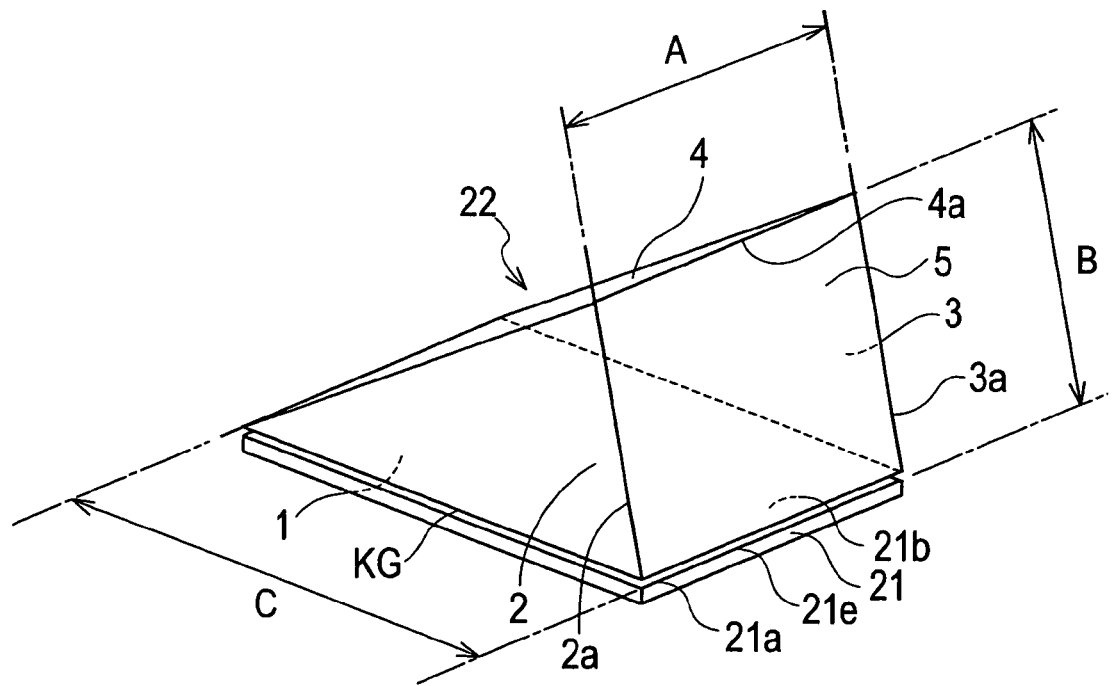
FIG. 5 is a perspective view showing the constitution of a light source device in accordance with a first embodiment of the present invention.

FIG. 5 is a perspective view showing the constitution of a light source device in accordance with a first embodiment of the present invention.

Figure 6:
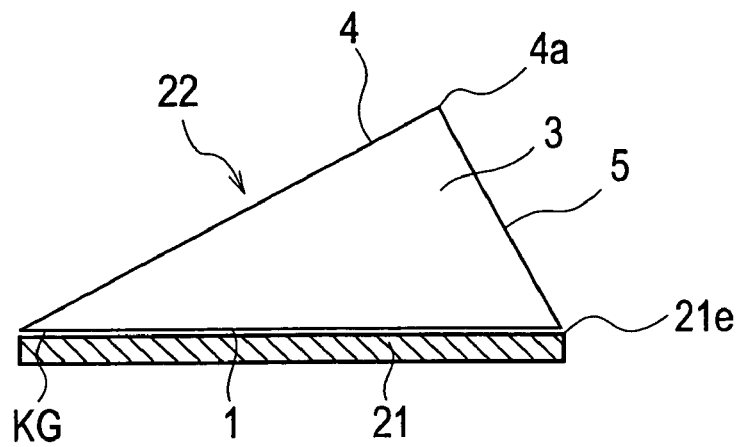
FIG. 6 is a longitudinal sectional view showing the constitution of the light source device of the first embodiment of the present invention.

FIG. 6 is a longitudinal sectional view showing the constitution of the light source device of the first embodiment.

The light source device has a solid light emitting element 21 as a surface emitting source, as shown in FIGS. 5 and 6. The solid light emitting element 21 comprises a reflecting film 21a on the back side and a light emitting layer (light emitting face) 21b on the front side. For example, so called "high-intensity LED" is available as the solid light emitting element 21.

Figure 7:
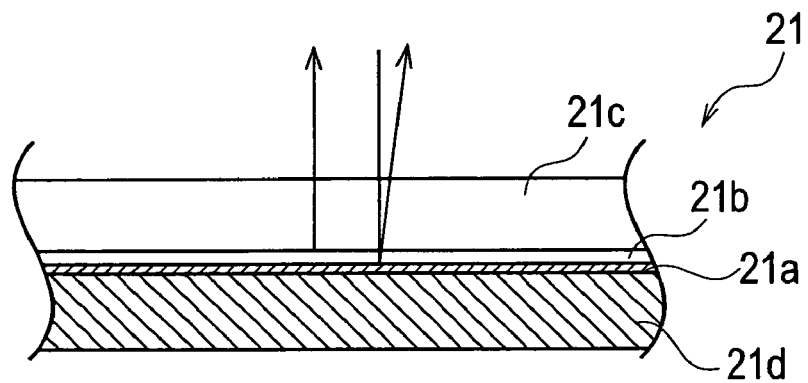
FIG. 7 is a sectional view showing the constitution of a solid light emitting element of the light source device of the present invention.

FIG. 7 is a sectional view showing the constitution of the solid light emitting element of the light source device of the present invention.

In the high-intensity LED, as shown in FIG. 7, the reflecting film 21a is formed on the back side of the light emitting layer 21b made from so-called "photonics crystal". Light emitted from the light emitting layer 21b against the front surface is emitted to the front side of the high-intensity LED as it is. Light emitted from the light emitting layer 21b against the back surface is reflected on the reflecting film 21a, and transmitted to the front side of the high-intensity LED through the light emitting layer 21b. Further, exterior light incident on the light emitting layer 21b is transmitted through it, further reflected on the reflecting film 21a, and emitted to the front side through the light emitting layer 21b. In this way, the high-intensity LED can exhibit the characteristics of high brightness because light component, which would be lost in the conventional LED due to optical absorption on its back side, is reflected and emitted to the front side.

Note that as the light emitting layer 21b of the LED is adapted so as to allow a transmission of light (of wavelength) that the light emitting layer 21b itself generates, incident light within the same band of wavelength on the LED will be transmitted through the light emitting layer 21b, and reflected on the reflecting film 21a on the back side of the LED.

For instance, the light emitting layer (light emitting face) 21b of the solid light emitting element 21 is shaped to be rectangular (e.g. 2 mm×6 mm).

As for materials for the light emitting layer 21b, there are AlGaAS, AlGaInP, GaAsP, etc. for red light emission, InGaN, AlGaInP, etc. for green light emission, and InGaN etc. for blue light emission. These "InGaN-type" materials are generally made due to epitaxial growth on a sapphire substrate 1c. Then, the reflecting layer 21a is formed by first exfoliating a semiconductor from the sapphire substrate 1c by using e.g. laser lift-off technique and subsequently flattening a P-type semiconductor surface. The reflecting layer 21 can be formed on the back surface of the semiconductor by means of direct sputtering etc. Note that the so-formed LED is arranged on a silicon substrate 21d while directing the reflecting layer 21a downwardly, and supplied with electricity through not-shown wire bindings.

As shown in FIGS. 5 and 6, the light source device includes an optical element (prism) 22 whose first face 1 is opposed to the light emitting layer 21b of the solid light emitting element 21 through a gap KG. In the optical element 22, the first face 1 has a configuration substantially identical to the light emitting layer 21b of the solid light emitting element 21. The optical element 22 has second and third opposing faces 2, 3 generally perpendicular to the first face 1, and also parallel to each other. In addition, the optical element 22 has a fourth face 4 generally perpendicular to the second and third face 2, 3, and opposed to the first face 1 on a slant. Finally, the optical element 22 is provided with a fifth face 5 whose periphery is formed by respective side edges of the first to fourth faces 1, 2, 3 and 4.

That is, a space surrounded by the first to fifth faces 1, 2, 3, 4 and 5 is in the form of a triangle pole whose bottom surfaces comprise the second and third faces 2, 3. In the so-formed optical element 22, the fifth face 5 has an area smaller than that of the first face 1 (i.e. area of the light emitting face 21b of the solid light emitting element 21).

Figure 8:
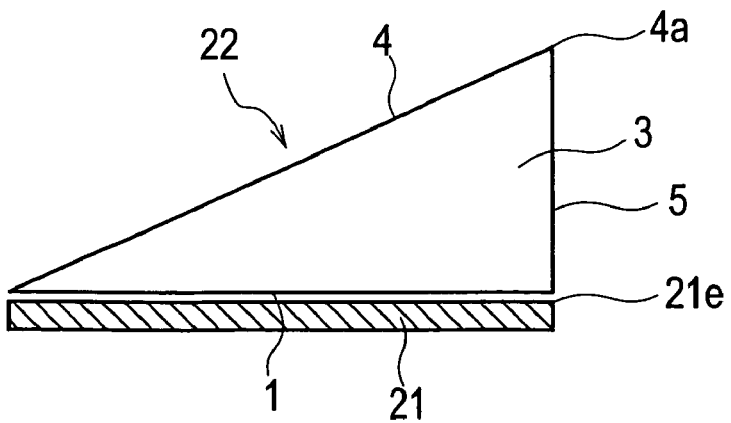
FIG. 8 is a sectional view showing the other constitution of the light source device of the first embodiment of the present invention.

It is noted that each of FIGS. 6 and 8 illustrates only the third face 3 because they are longitudinal sectional views where the second face 2 does not appear due to its positioning.

In this embodiment, as shown in FIG. 5, one side edge 21e of the reflecting film 21a of the solid light emitting element 21, which constitutes a part of the periphery of the fifth face 5, coincides with one short side of the light emitting face 21b of the element 21. In the fifth face 5, therefore, two opposing sides (i.e. the side edge 21e and one side edge 4a of the fourth face 4) have lengths equal to the short side of the light-emitting face of the solid light emitting element 21 (length: shown with arrow A of FIG. 5). While, the other two opposing sides of the fifth face 5 (i.e. side edges 2a, 3a) have lengths (shown with arrow B of FIG. 5) shorter than a long side of the light-emitting face of the element 21 (length: shown with arrow C of FIG. 5).

Thus, a polyhedral space surrounded by the first to fifth faces, in other words, an interior of the optical element 22 is filled up with transparent medium whose refractive index is larger than that of the circumferential medium (e.g. air). As for the medium filling the optical element 22, there are available, for example, cycloolefin copolymer such as "ZEONEX (trademark)" by Nippon Zeon Co. Ltd., other optical synthetic resin materials and various optical glass material.

In this light source device, light emitted from the solid light emitting element 21 enters into the optical element 22 through the first face 1, and is reflected by any one of the first to fourth faces 1, 2, 3, 4 and the reflecting film 21a of the element 21. Then, the so-reflected light is emitted to an outside through the fifth face 5. Alternatively, the light entering into the element 21 is emitted to the outside without being reflected by these faces 1, 2, 3, 4 and the reflecting film 21a.

In the optical element 22, supposing that "θ" denotes an incident angle of the light beam on this surface; "n" denotes the refractive index of a medium outside the optical element 22; and "n'" denotes the refractive index of a medium inside the optical element 22, the condition enabling light beam to be totally reflected on a certain surface will be represented as $$\sin\theta = n/n'.$$

Supposing that, for instance, the medium outside the optical element 22 is air having the refractive index n of 1, and the medium inside the optical element 22 is "BK-7" having the refractive index n' of 1.51, the incident angle θ becomes approx. 41°. Thus, it means that in the optical element 22, light beam having an incident angle on a certain surface more than 41° is subjected to total reflection. Therefore, even if the reflecting film 21a of the solid light emitting element 21 has a small reflectivity, this light source device can lead light beams inside the optical element 22 to the fifth face 5 effectively due to the presence of light beams totally reflected on the first face 1.

Preferably, the fourth face 4 of the optical element 22 is formed with either a reflecting surface made from reflecting material or a microstructural reflecting part composed of photonic crystal. As the reflecting material, there is available Al (aluminum) film, Ag (silver) film or dielectric film. If forming Al film as the reflecting film on the fourth face 4 of the optical element 22, the reflectivity of the fourth face 4 having Al film formed thereon becomes approx. 98% (note: Reflectivity of the fourth face 4: 92%). If adopting either the dielectric film or the microstructural reflecting part of photonic crystal, only specified monochromatic light (including light having a wavelength width of several dozen nanometers, such as LED's light) for example, any of R (red light), G (green light) and B (blue light) is reflected at the dielectric film of the reflecting part.

As for the characteristic curve (etendue curve) in this light source device, the intensity (relative luminance) of light emitted from the above device becomes larger than that of the characteristic curve (under the same etendue) of the solid light emitting element 21 as a single body. As mentioned previously, the etendue is represented by $S\pi \sin^2 \theta$ (wherein S: light emitting area; θ: irradiation angle of light beams). The characteristic curve of etendue represents an intensity of emission light (relative luminance: vertical axis) that would be obtained if setting the etendue (horizontal axis) to a predetermined value, in other words, the light emitting area S and the irradiation angle θ have predetermined values respectively. In connection, it is noted that the light emitting area S corresponds to an area of the fifth face 5 in the light source device, while the light emitting area S corresponds to an area of the light emitting face 21b in the solid light emitting element 1 as a single body. In addition, as the second and third faces 2, 3 are parallel to each other, the light source device of the invention has a reduced number of reflections to which the light beam is subjected in a polyhedron of the reflecting film 21a and the respective reflecting surfaces 2, 3, 4 until it is emitted out of the fifth face 5. Further, since the so-reflected light is hard to get back to the solid light emitting element 21, it is possible to project the light beams with high efficiency.

FIG. 8 is a sectional view showing the other constitution of the light source device in accordance with the first embodiment of the present invention.

Although the fifth face 5 of the optical element 22 is preferably formed to be generally perpendicular to the fourth face 4 as shown in FIG. 6, the fifth face 5 may be formed so as not to be perpendicular to the fourth face 4, as shown in FIG. 8. Although the light emitting face 21b of the solid light emitting element 21 and the fifth face 5 are together formed to be rectangular in this embodiment, there is no limitation in the shape of these elements.

$2^{nd}$. Embodiment of Light Source Device

Figure 9:
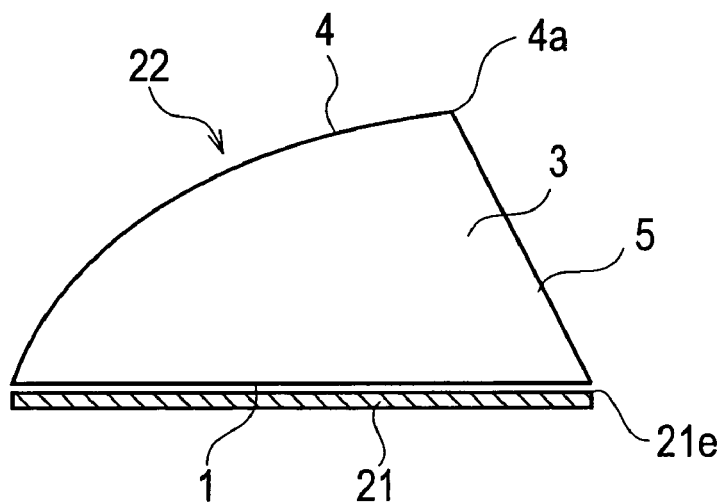
FIG. 9 is a sectional view showing the constitution of a light source device in accordance with a second embodiment of the present invention.

FIG. 9 is a sectional view showing the constitution of the light source device in accordance with the second embodiment of the present invention. It is noted that FIG. 9 illustrates only the third face 3 because it is a longitudinal sectional view where the second face 2 does not appear due to its positioning.

According to this embodiment, as shown in FIG. 9, the fourth face 4 is curved so as to be concave toward the solid light emitting element 21. In connection, the fourth face 4 may be in the form of a cylindrical surface which is linearly-shaped along a direction parallel to the side edge 4a. Alternatively, the fourth face 4 may be in the form of a spherical surface, a paraboloidal surface or a high-order curved surface. In all these cases, respective reflecting surfaces 1, 2, 3, 4 and 5 constitute a closed polyhedron.

Commonly, the light emitted from the solid light emitting element 21 is projected to an outside through the fifth face 5 after being multiply-reflected by any of the first to fourth faces 1, 2, 3, 4 and the reflecting film 21a of the element 21 or without being reflected by them.

3rd. Embodiment of Light Source Device

Figure 10:
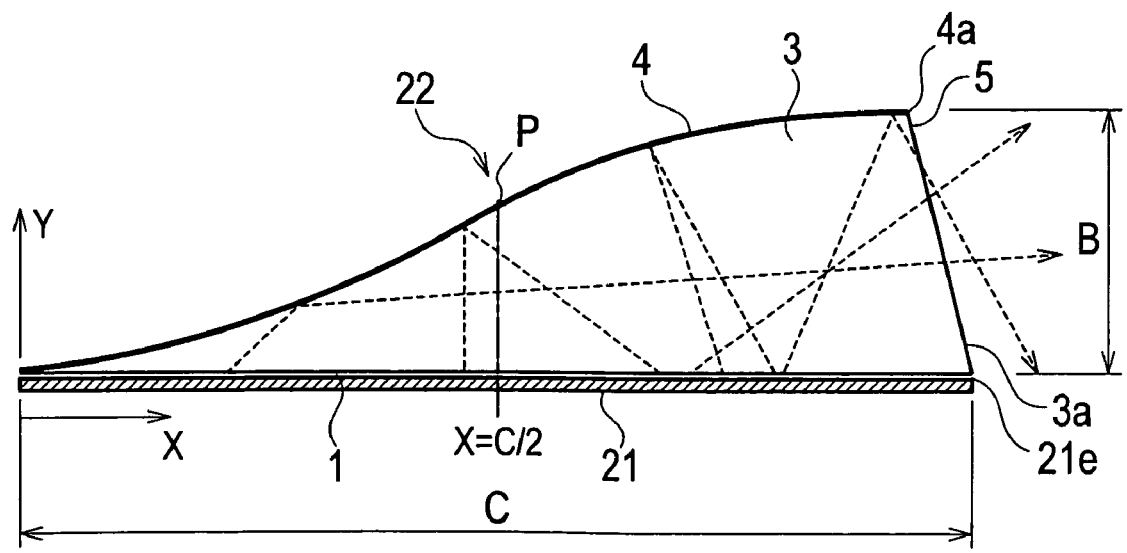
FIG. 10 is a sectional view showing the constitution of a light source device in accordance with a third embodiment of the present invention.

FIG. 10 is a sectional view showing the constitution of the light source device in accordance with the third embodiment of the present invention. FIG. 10 also illustrates only the third face 3 because it is a longitudinal sectional view where the second face 2 does not appear due to its positioning.

According to the embodiment, the configuration of the fourth face 4 is optimized so as to maximize the utilization efficiency of light. In detail, as shown in FIG. 10, the fourth face 4 (i.e. its surface opposed to the solid light emitting element 21) is generally divided into two face parts (i.e. first and second face parts) interposing an inflection point P therebetween. Thus, the first face part close to the fifth face 5 (comparing with the second face part) is cylindrical-shaped so as to be concave toward the first face 1, while the second face part far from the fifth face 5 is cylindrical-shaped so as to be convex toward the first face 1. Further, the fourth face 4 is curved so as to be a cylindrical surface which is linearly-shaped along a direction parallel to the side edge 4a.

If the fifth face 5 has an area equal to 25% of the area of solid light emitting element 21 and the reflectivity of the reflecting film 21a is 60%, then the optimized configuration of the fourth face 4 can be represented by $$Y=B^* \sin^{1.25}(X\pi/4C).$$

In the above equation, "B" denotes a height of the fifth face 5 from the solid light emitting element 21 (shown with arrow B of FIG. 10: each height of the side edges 2a, 3a of the second and third faces 2, 3), "C" a length of the long side of the light emitting face of the solid light emitting element 21 (shown with arrow C of FIG. 10), "X" a distance from one side of the solid light emitting element 21 far from the fifth face 5, and "Y" denotes a height from the solid light emitting element 21 to the fourth face 4 at a certain distance X.

In this curve, the inflection point P coincides with a center of the fourth face 4 (i.e. X=C/2). Further, this curve gradually approaches a straight line as the reflectivity of the reflecting film 21a of the solid light emitting element 21 gets increased.

$4^{th}$. Embodiment of Light Source Device

Figure 11:
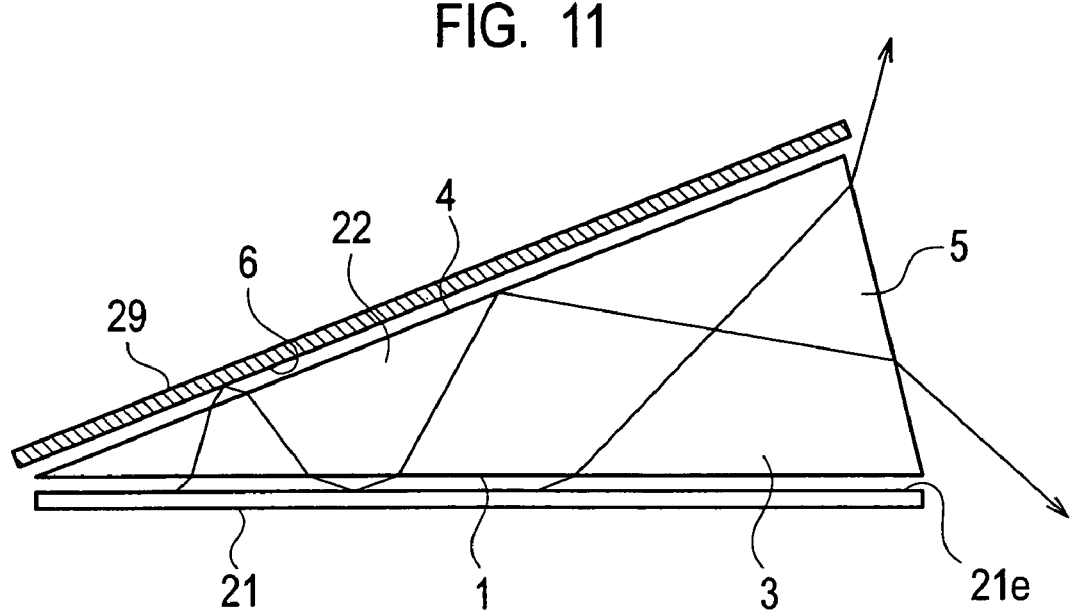
FIG. 11 is a sectional view showing the constitution of a light source device in accordance with a fourth embodiment of the present invention.

FIG. 11 is a sectional view showing the constitution of the light source device in accordance with the fourth embodiment of the present invention. FIG. 11 also illustrates only the third face 3 because it is a longitudinal sectional view where the second face 2 does not appear due to its positioning.

According to this embodiment, any reflecting surface composed of reflecting material is not formed on the fourth face 4 of the optical element 22. Instead, a reflecting surface 6 is arranged in substantially-parallel to the fourth face 4, as shown in FIG. 11. The reflecting surface 6 is carried by a support 29. A minute space between the fourth face 4 and the reflecting surface 6 is filled up with medium having a refractive index less than that of the previous medium fling the interior of the optical element 22. The reflecting surface 6 is coated with Al (aluminum) film (reflectivity: 92%), Ag (silver) film (reflectivity: 98%) or dielectric film. Alternatively, a microstructural reflecting part of photonic crystal may be formed on the reflecting surface 6. In operation, as mentioned previously, the dielectric film or the microstructural reflecting part is adapted so as to reflect only specified monochromatic light (including light having a wavelength width of several dozen nanometers, such as LED's light) for example, any one of R (red light), G (green light) and B (blue light).

Preferably, the support 29 is made from material capable of forming the reflecting film thereon and having the properties of heat resistance and/or heat conductivity. As the materials superior in heat resistance, there are recommended hyaline materials (e.g. "BK7", "B270"), ceramics and so on. As the materials superior in heat conductivity, there are recommended metals, such as Ag, Cu and Al. Alternatively, the reflecting surface 6 superior in reflectivity, heat resistance and heat conductivity may be realized by grinding the surface of the support 29 made from metal.

In the above optical device, light transmitted through the fourth face 4 without being total-reflected thereon is reflected on the reflecting surface 6, and returned into the optical element 22. Again, almost all light getting back to the optical element 22 is further returned up to the solid light emitting element 21. That is, the light emitted from the solid light emitting element 21 is projected to an outside through the fifth face 5 after being multiply-reflected by any of the first to fourth faces 1, 2, 3, 4, the reflecting film 21a of the element 21 and the reflecting surface 6 or without being reflected by them.

According to the embodiment, as no reflecting material is formed on the fourth face 4, it is possible to prevent it from being heated by the light incident on the same face 4.

In the optical element 22, supposing that "θ" denotes an incident angle of the light beam on the relevant surface; "n" denotes the refractive index of a medium outside the optical element 22; and "n'" denotes the refractive index of a medium inside the optical element 22, the condition enabling light beam to be totally reflected on the first face 1 or the fourth face 4 will be represented as $$\sin \theta = n/n'.$$

Supposing that for instance, the medium outside the optical element 22 is air having the refractive index n of 1, and the medium inside the optical element 22 is "BK-7" having the refractive index n' of 1.51, the incident angle θ becomes approx. 41°. Thus, it means that in the optical element 22, light beam having an incident angle on a certain surface more than 41° is subjected to total reflection. Therefore, even if the reflecting film 21a of the solid light emitting element 21 has a small reflectivity, it is possible to collect light beams to the fifth face 5 effectively due to the presence of light beams totally reflected on the first face 1.

Similarly to the previous embodiments, the fourth face 4 may be formed with a curved surface (cylindrical surface), which also extends linearly along a direction parallel to the side edge 4a constituting a part of the fifth face 5 in the meantime (see FIG. 9). In this case, the reflecting surface 6 would be curved along the fourth face 4.

5th. Embodiment of Light Source Device

Figure 12:
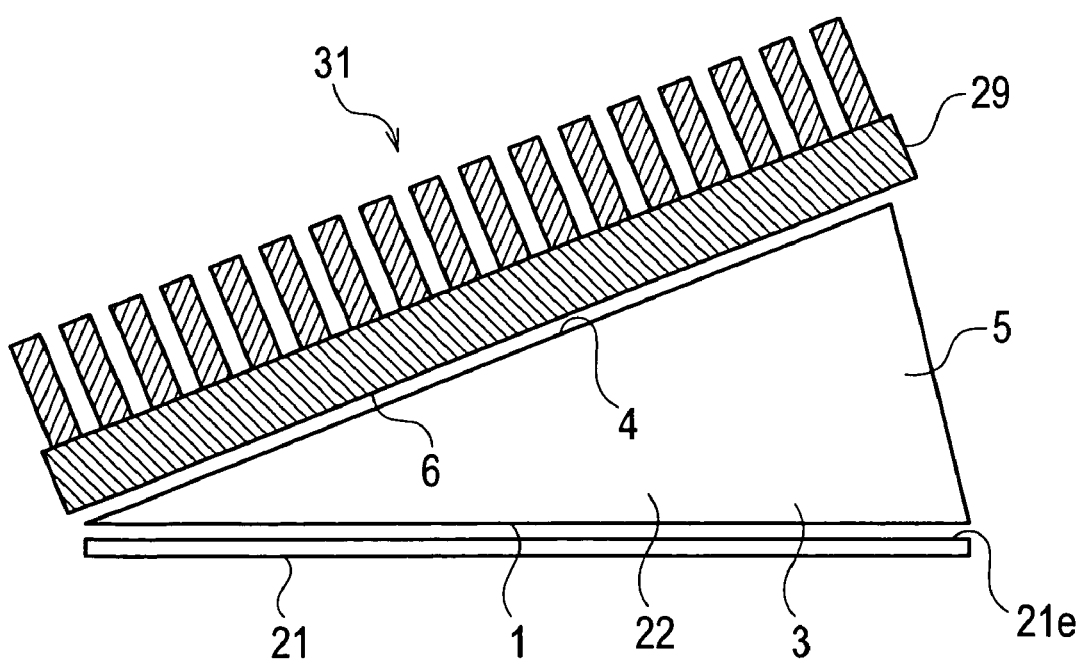
FIG. 12 is a sectional view showing the constitution of a light source device in accordance with a fifth embodiment of the present invention.

FIG. 12 is a sectional view showing the constitution of the light source device in accordance with the fifth embodiment of the present invention. FIG. 12 also illustrates only the third face 3 because it is a longitudinal sectional view where the second face 2 does not appear due to its positioning.

In the light source device of the fifth embodiment, as shown in FIG. 12, a cooling mechanism is provided on the backside of the support 29 for carrying the reflecting surface 6. In detail, the support 29 is provided with a heat sink structure 31 corresponding to the cooling mechanism. The heat sink structure 31 is formed with a plurality of cooling fins implanted in the support 29. The heat sink structure 31 is made from material superior in heat conductivity, for example, metals of Ag, Cu, Al, etc.

In the light source device, since heat produced on the reflecting surface 6 due to light incident thereon is radiated to the outside through the support 29 and the heat sink structure 31, it is possible to suppress a rising of temperature of the reflecting surface 6.

Also in this embodiment, preferably, the support 29 for the reflecting surface 6 is made from material capable of forming the reflecting film thereon and having the properties of heat resistance and/or heat conductivity. As the materials superior in heat resistance, there are recommended hyaline materials (e.g. "BK7", "B270"), ceramics and so on. As the materials superior in heat conductivity, there are recommended metals, such as Ag, Cu and Al. Alternatively, the reflecting surface 6 superior in reflectivity, heat resistance and heat conductivity may be realized by grinding the surface of the support 29 made from metal. If the support 29 is made from metal, it is possible to form the heat sink structure 31 integrally with the support 29.

Figure 13:
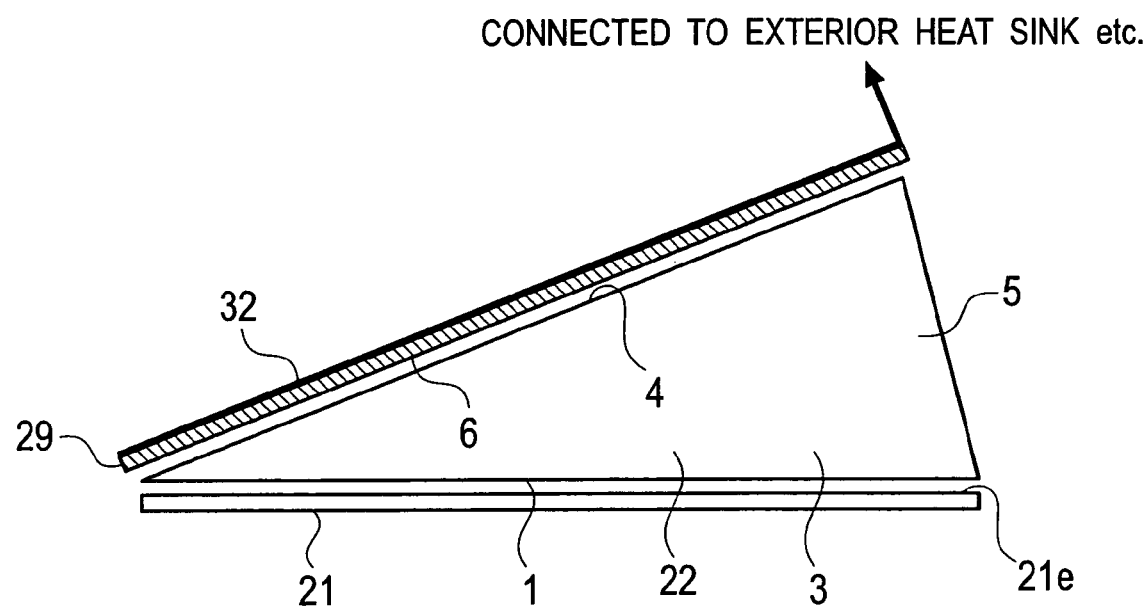
FIG. 13 is a sectional view showing the other constitution of the light source device of the fifth embodiment of the present invention.

FIG. 13 is a sectional view showing the other constitution of the light source device in accordance with the fifth embodiment of the present invention. FIG. 13 also illustrates only the third face 3 because it is a longitudinal sectional view where the second face 2 does not appear due to its positioning.

In this modification, as shown in FIG. 13, the above cooling mechanism is not arranged on the support 29 carrying the reflecting surface 6, directly. Instead, a graphite sheet 32 is adhered to the back surface of the support 29 so as to transfer heat of the support 29 to a not-shown cooling mechanism (heat sink etc.). The graphite sheet 32 is identical to a sheet member made from graphite crystals, which is superior in heat conductivity in a specific direction. The heat of the support 29 is transmitted to the cooling mechanism (heat sink etc.) through the graphite sheet 32 effectively.

In the light source device, as heat produced on the reflecting surface 6 due to incidence of light is radiated to the outside through the support 29, the graphite sheet 32 and the cooling mechanism, it is possible to suppress a rising of temperature of the reflecting surface 6.

Suppose here that the reflecting material forming the reflecting surface 6 has a reflectivity of 98% (i.e. optical absorption of 2%). If the number of reflections of light on the reflecting surface 6 is five, then the total reflectivity becomes the fifth power of 98%, that is, reflectivity of 90%, so that the light of approx. 10% is absorbed in the reflecting material. It means that if the power of incident light is 10 W, then the light of 1 W is absorbed in the reflecting material, in the form of heat. Suppose that the medium forming the optical element 22 has a mass of 0.025 g (4 mm×2.5 mm×1 nm, specific gravity: 2.5) and a calorific value of the optical element 22 is 0.7 (J/gK). If the above heat is accumulated in the optical element 22, then the temperature rise per second becomes as follows:

$$(1 \times 1)/(0.7 \times 0.025) = 13.4[K].$$

That is, assuming that no heat is radiated from the optical element 22, the temperature of the element 22 is elevated in increments of 13.4° C. per second. In such a case, the optical element 22 would be finally subjected to deformation, breakage, fusion or the like.

In the light source device, owing to the provision of either the heat sink structure 31 on the support 29 for the reflecting surface 36 or the cooling mechanism via the graphite sheet 32, heat produced on the reflecting surface 6 is released to the outside. Further, since the above gap between the reflecting surface 6 and the optical element 22 is filled up with medium (e.g. air) of high heat insulating properties, it is possible to suppress the thermal influence of the reflecting surface 6 on the optical element 22, as much as possible.

Similarly to the previous embodiments, the fourth face 4 may be formed with a curved surface (cylindrical surface), which also extends linearly along a direction parallel to the side edge 4a constituting a part of the fifth face 5 in the meantime (see FIG. 9). In this case, the reflecting surface 6 would be curved along the fourth face 4.

6th. Embodiment of Light Source Device

Figure 14:
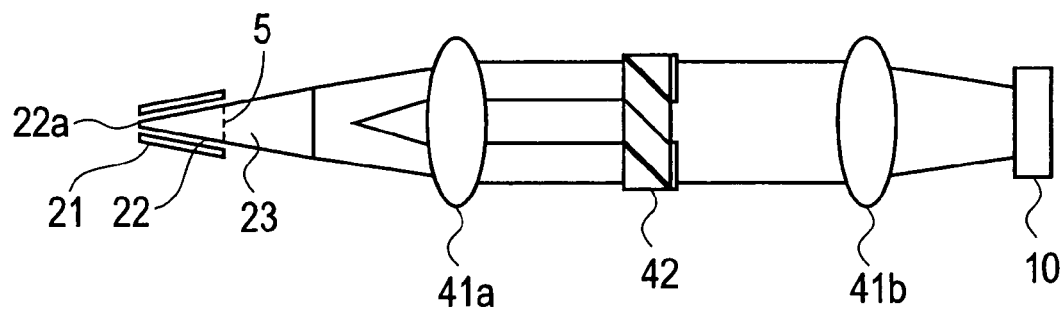
FIG. 14 is a sectional view showing the constitution of a light source device in accordance with a sixth embodiment of the present invention.

FIG. 14 is a sectional view showing the constitution of the light source device in accordance with the sixth embodiment of the present invention.

This light source device is provided by combining lenses 41a, 41b and a polarization converting element 42 with the previously-mentioned light source device composed of the solid light emitting element 21 and the optical element 22, and further constructing the resultant assembly so as to illuminate an image display panel 10. By the lens 41a, light emitted from the exit face (the fifth face 5) of the optical element 22 is irradiated to an incident surface of the polarization converting element 42.

In addition, the light source device includes a light pipe 23 formed in succession to the fifth face 5. With the arrangement of the light pipe 23 formed in integral with the optical element 22 successively, by radiating light flux from the optical element 22 at an appropriate angle and also increasing the take-off amount of light at the fifth face 5, it is possible to increase the intensity of illuminating light on the spatial light modulating element.

Figure 15:
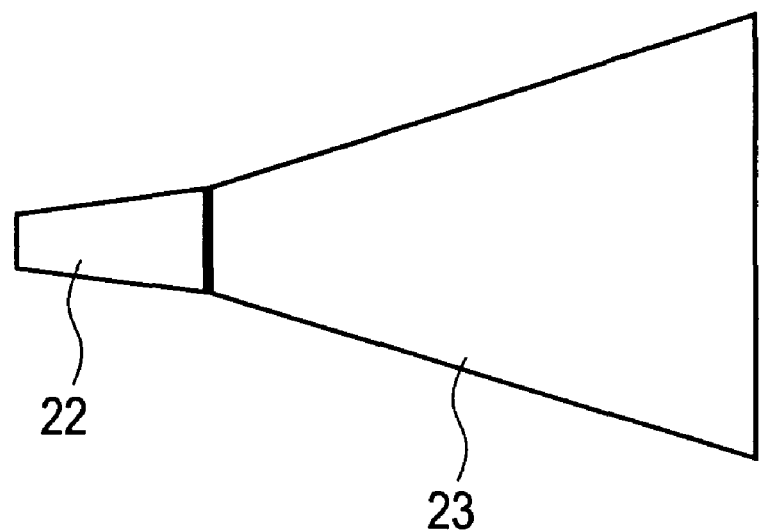
FIG. 15 is a side view showing a light pipe in accordance with a ninth embodiment of the present invention.

FIG. 15 shows the optical element 22 having the light pipe 23 formed successively and integrally therewith. With the light pipe 23 that is tapered so as to increase its diameter as departing from the optical element 22, it is possible to decrease an internal reflection of the optical element 22 at the fifth face 5 and increase the amount of light flux emitted from the optical element 22.

Figure 16:
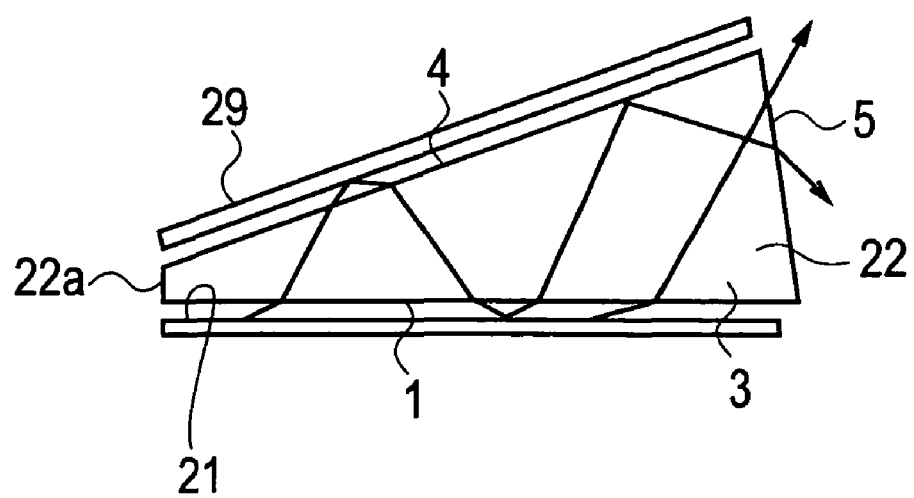
FIG. 16 is a sectional view showing the constitution of an optical element of the light source device of the sixth embodiment of the present invention.

FIG. 16 is a sectional view showing the constitution of the optical element in the light source device of the sixth embodiment.

In the light source device, the optical element 22 is provided with a sixth face 22a which is derived from a structure where the first face 1 does not make contact with the fourth face 4. Thus, the structure shown in FIG. 16 eliminates the need for processing an edge where the first face 1 abuts on the fourth face 4 with high accuracy, allowing the manufacturing cost and time to be reduced advantageously. In addition, as the mechanical strength of the above edge is reinforced, it is possible to prevent an occurrence of chips and cracks about the edge. However, it should be noted that the emission light from the optical element 22 is lowered in brightness in comparison with the optical element without the sixth face 22a, causing the angle distribution of the optical element to be varied.

Figure 17A:
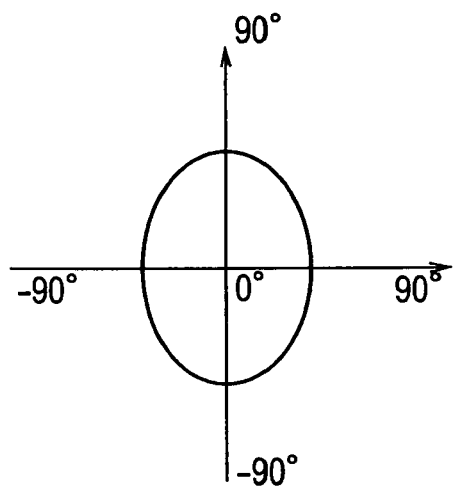
FIGS. 17A and 17B are graphs showing the angle distributions of light incident on a fifth face and FIGS. 17C and 17D are graphs showing the distributions of light incident on a polarization converting element.
Figure 17B:
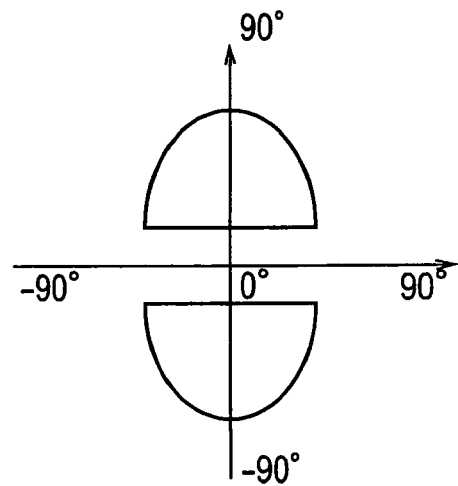
Figure 17C:
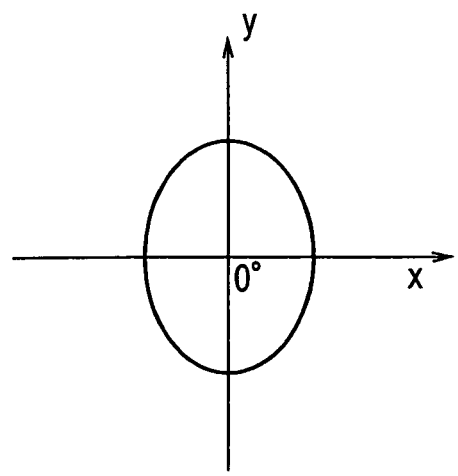
Figure 17D:
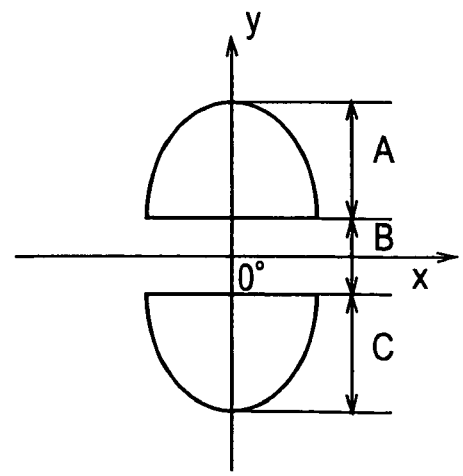

FIGS. 17A and 17B are graphs showing the angle distribution of light at the fifth face 5, while FIGS. 17C and 17D show the distributions of light incident on the polarization converting element 42.

As mentioned before, if the optical element 22 does not have the sixth face 22a (i.e. structure having an edge composed of the first face 1 and the fourth face 4), then the angle distribution of light at the fifth face 5 centers on 0°, as shown in FIG. 17A. On the other hand, if the optical element 22 is formed with the sixth face 22a (i.e. structure where the first face 1 does not make a contact with the fourth face 4), the angle distribution is divided up and down, as shown in FIG. 17B.

As a result, the optical path of light emitted from the optical element 22 is divided up and down, so that the incident light on the polarization converting element 42 is also divided up and down, as shown in FIG. 17D.

Figure 18A:
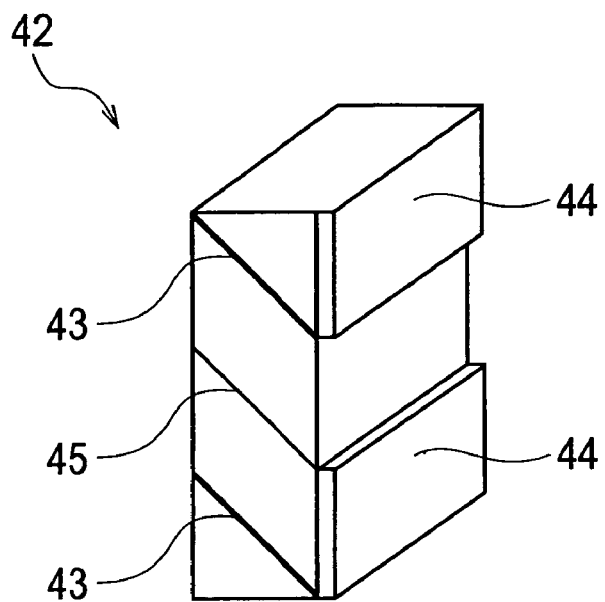
FIGS. 18A and 18B are sectionals view explaining the operation of the polarization converting element.
Figure 18B:
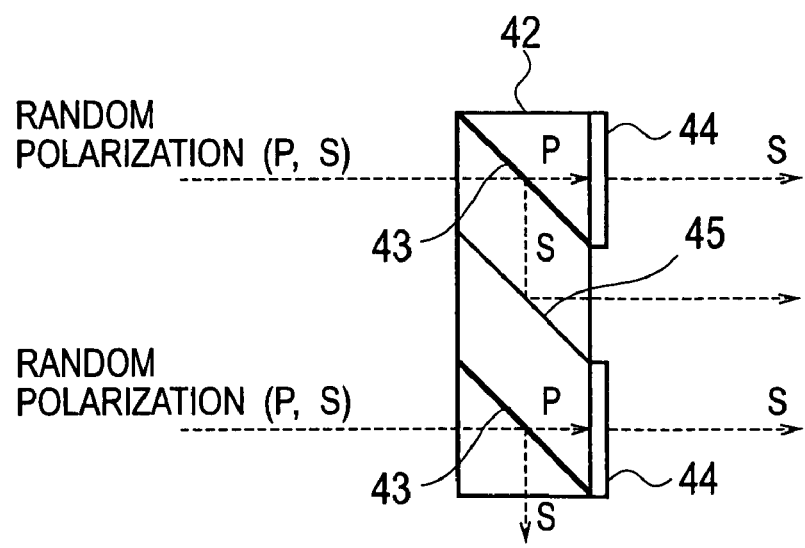

FIGS. 18A and 18B are sectionals view explaining the operation of the polarization converting element.

In the polarization converting element 42, as shown in FIGS. 18A and 18B, the incident light enters a polarization separating element 43 for polarization conversion. The light through the polarization separating element 43 is transmitted through a wave plate 44, and further emitted to the outside while converting the polarization direction by 90 degrees. The light reflected by the polarization separating element 43 is further reflected by a reflecting surface 45, and emitted to a direction parallel to the light transmitted through the wave plate 44.

As shown in FIGS. 18A and 18B, the illustrated polarization converting element 42 comprises, as constituents, the polarization separating elements 43, the reflecting surface 45 and the wave plates 44 in order to separate light of random polarization into P-polarization and S-polarization 3. Further, this polarization converting element 42 rotates the polarization angle of one polarized light by 90 degrees, and mixes this polarized light with the other polarized light thereby to improve its light use efficiency in comparison with other types of elements for picking up only a specified polarized light simply. In general, a PBS (Polarized Beam Splitter) is used to separate the polarized light, while a half-wavelength plate is used to rotate the polarization angle by 90 degrees.

Here, it should be noted that the polarization converting element 42 has the polarization separating elements 43 arranged one after another while interposing the reflecting surface 45 therebetween. Therefore, if light is irradiated to the polarization converting element 42 as a whole uniformly, then the light is divided into one light component incident on the polarization separating elements 43 and another light component incident on a reflecting surface's back surface on the opposite side of the incident side of S-wave on the reflecting surface 45. Although the above-mentioned separation/conversion of polarized light is applicable to the former light component incident on the polarization separating elements 43, the separation/conversion of polarized light is inapplicable to the latter light component incident on the back surface of the reflecting surface 45, causing the light use efficiency to be lowered as a consequence.

On the contrary, if light could be selectively irradiated to such areas allowing the light to be brought on the polarization separating elements 43, it would be possible to exclude the light component that would be unavailable on the backside of the reflecting surface 45, allowing the light use efficiency to be improved in comparison with the case of irradiating the light to the polarization converting element 42 uniformly. Simultaneously, as one of the light components separated by the polarization separating elements 43 is introduced to the intermediate portion of the polarization converting element 42 by the reflecting surface 45, the above-mentioned vertical (up-and-down) separation in the intensity-distribution of light is cancelled to allow the light emitted from the same element 42 to be unformalized.

According to the embodiment, therefore, the optical element 22 is used to divide the angle distribution of light incident on the polarization converting element 42 into two light components vertically. In this case, as the so-divided light components are respectively led to the polarization separating element 43, thereby to realize the polarization conversion of the polarization converting element 42 for the entire light, it is possible to save the manufacturing cost and time of the optical element 22 while employing its configuration ensuring a mechanical strength. In addition, it is possible to prevent a deterioration of light, realizing the uniform intensity distribution of light.

If the incident light on the polarization converting element 42 is equivalent in between an irradiated region and an unirradiated region, in other words, the proportion of respective heights shown in FIG. 17D is represented by A:B:C=1:1:1, then the entire light enters the polarization separating element 43, so that it is possible to prevent a loss of light in polarization and conversion.

In the light emitted from the polarization converting element 42, additionally, as a half of light in the area A of FIG. 17D is shifted into the area B, so that the vertical separation of light is dissolved to realize the uniform distribution of light.

Figure 19A:
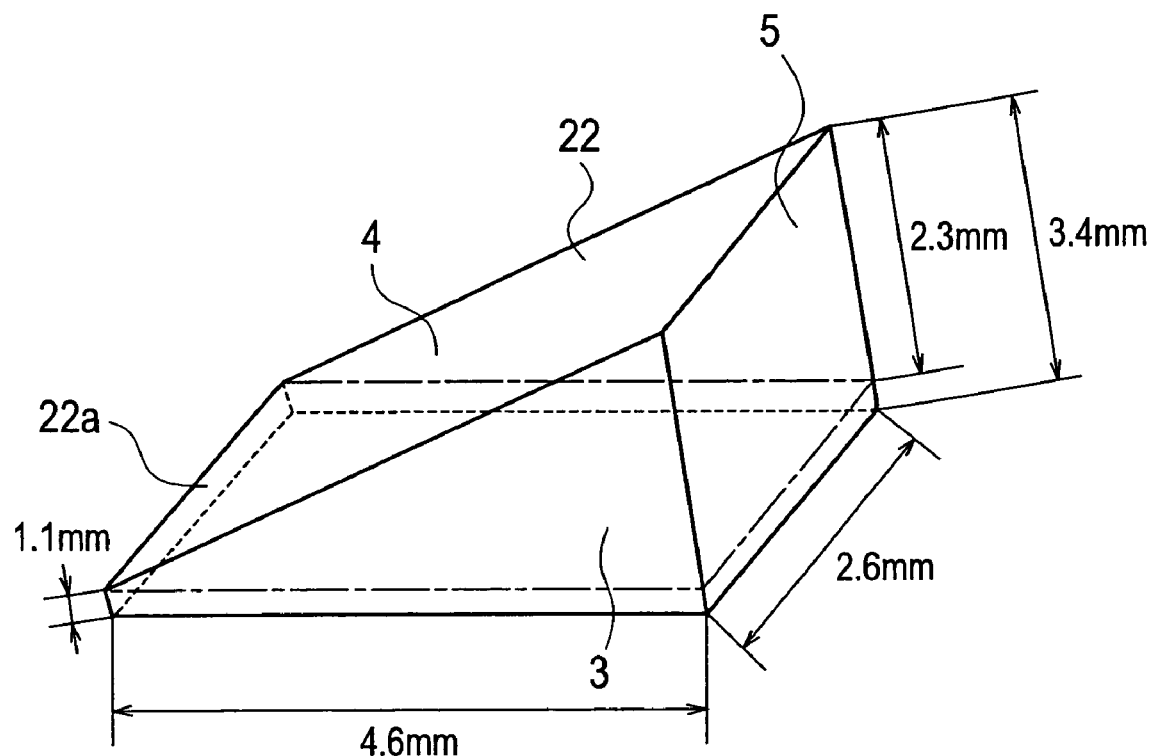
FIG. 19A is a perspective view showing a shape example of an optical element and FIG. 19B is a view showing the distribution of incident light on the polarization converting element in using the optical element of FIG. 19A.

FIG. 19A is a perspective view showing a profile example of the optical element 22.

Figure 19B:
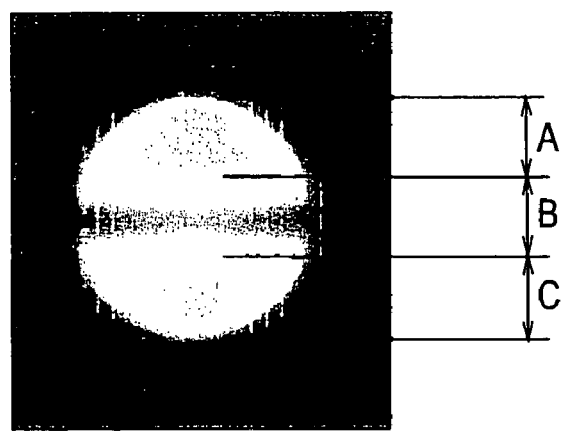

As one example, FIG. 19B shows the distribution of incident light on the polarization converting element 42 in using the optical element 22 of FIG. 19A. Here the sixth face illustrated in FIG. 19A is formed with an edge of 1.1 mm in height. Then, the intensity of light incident on the polarization converting element 42 is distributed up and down, as shown in FIG. 19B. Focusing the areas cutting the light intensity in halves in FIG. 19B, the proportion of respective areas will be roughly A:B:C=1:1:1 in terms of height Note that this calculation result is premised on the adoption of hyaline material "BK7" (n: 1.51) as the inside medium of the optical element 22, Ag-mirror (reflectivity: 98%) as the fourth face 4 and 60% as the reflectivity of the reflecting surface of the solid light emitting element 21.

Figure 20:
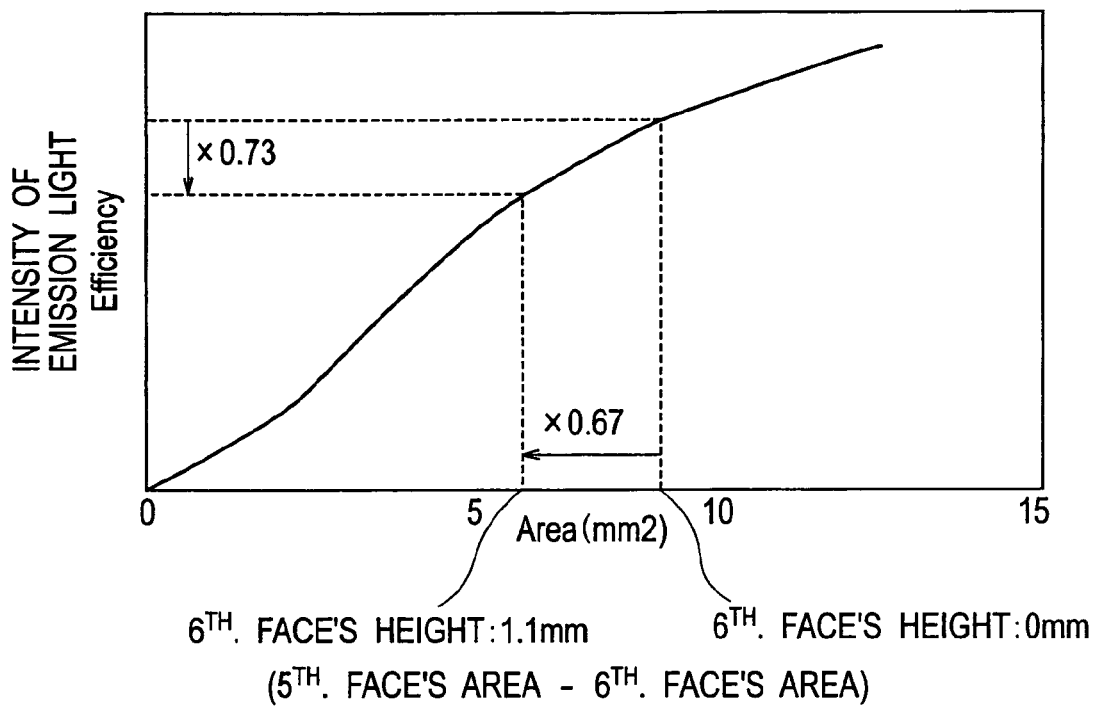
FIG. 20 is a graph showing the intensity of outgoing light with respect to [fifth face's area−sixth face's area] in the light source device.

FIG. 20 is a graph showing the intensity of emission light with respect to [fifth face's area−sixth face's area] in the light source device. According to the shown graph, it will be found that the intensity of emission light changes as the parameter [fifth face's area−sixth face's area] varies, although the change is not in a linear fashion. For instance, if the optical element 22 has a configuration as shown in FIG. 16 and the proportion of A:B:C becomes 1:1:1 (wherein the sixth's face height is 1.1 mm), then the value of [fifth face's area−sixth face's area] becomes two thirds (⅔: 0.67 times) of a value of [fifth face's area−sixth face's area] in case that the sixth face area of the optical element 22 is zero, namely, lack of the sixth face. From FIG. 20, it will be found that if the value of [fifth face's area−sixth face's area] decreases by 0.67 times, then the light intensity decreases by 0.73 times. It means that when the height of the sixth face is set to 1.1 mm, the intensity of emission light becomes 0.67 times of an emission light's intensity in case of 0 mm in height of the sixth face.

Meanwhile, if adopting the polarization converting element 42, the above relationship is reversed. That is, when the height of the sixth face is 0 mm, the incident light is irradiated to the polarization converting element 42 evenly, so that the amount of light subjected to polarization conversion will be 50% of the incident light Much the same is true on an arrangement using a reflective polarization plate in place of the polarization converting element 42. On the contrary, if the sixth face is formed with 1.1 mm in height, it is possible to allow all the light components separated into the areas A and C (in FIG. 17D) to enter the polarization separating element 43 with no loss. In addition, as both of P-polarized light component and S-polarized light component can be utilized in the light in the area A, the intensity of light upon polarization conversion is improved up to three quarters (75%) of the incident light.

Now, we calculate the total light use efficiency by multiplying the intensity of emission light by the efficiency of polarization conversion. The calculation result is shown in Table 1. From Table 1, it will be understood that the efficiency in the sixth face of 1.1 mm in height becomes 55%, while the efficiency in the sixth face of 0 mm in height becomes 50%, producing an improvement of 10% in efficiency.

TABLE 1

| $6^{th}$. face | emission light intensity (a) | polarization conversion efficiency (b) | total efficiency (a * b) |
|---|---|---|---|
| height: 1.1 mm | 73% | 75% | 55% |
| height: 0 mm | 100% | 50% | 50% |

Therefore, by forming the optical element 22 as shown in FIG. 16 and combining it with the polarization converting element 42, it is possible to improve the light use efficiency in the system utilizing polarization.

Figure 21:
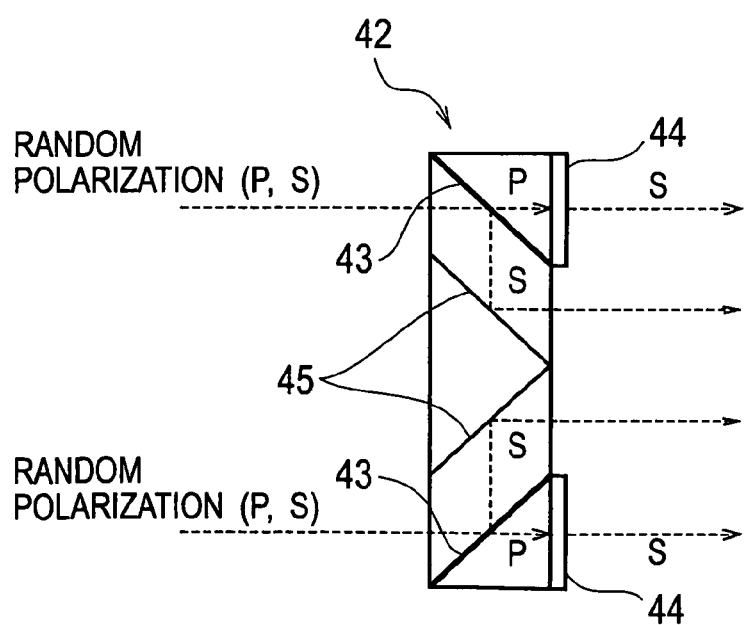
FIG. 21 is a sectional view showing another example of the constitution of a polarization converting element.

FIG. 21 is a sectional view showing another example of the polarization converting element.

As shown in FIG. 21, even if the polarization converting element 42 is shaped so as to shift the light components from both vertical sides of the element 42 to the center, it is possible to calculate the total efficiency similarly, and also possible to select the most appropriate profile depending on a system on application. If the polarization converting element 42 of FIG. 21 is used, the light use efficiency would be optimized on condition that the distribution of light incident on the polarization converting element 42 of FIG. 17D, that is, the proportion of A:B:C becomes equal to 1:2:1.

Figure 22:
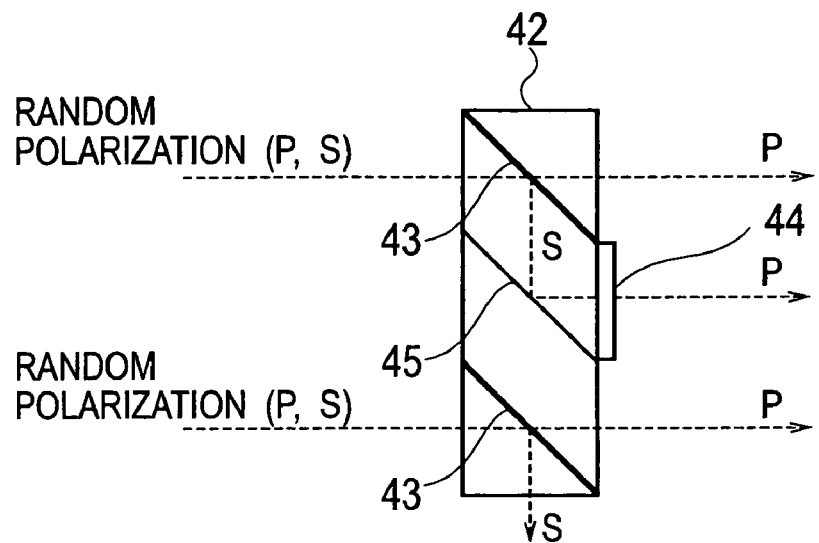
FIG. 22 is a sectional view showing a further example of the constitution of the polarization converting element.

FIG. 22 is a sectional view showing a further example of the polarization converting element.

In FIG. 22, the polarization converting element 42 is provided, between one polarization separating element 43 and the reflecting surface 45, with the wave plate 44 which converts the direction of polarization by 90 degrees. In operation, the incident light (component) transmitted through each polarization separating element 43 is emitted as it is. On the other hand, the light reflected by the polarization separating element 43 is further reflected by the reflecting surface 45, and transmitted through the wave plate 44 for converting the direction of polarization by 90 degrees.

$7^{th}$. Embodiment of Light Source Device

Figure 23:
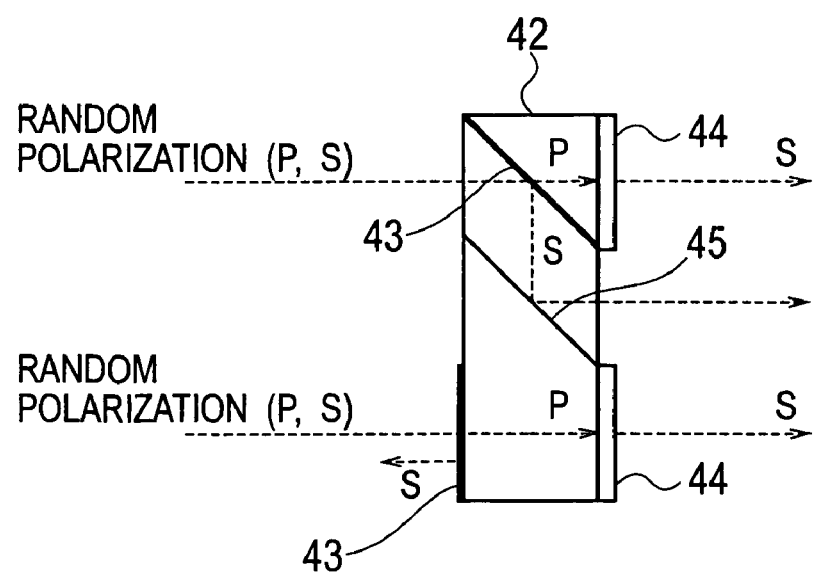
FIG. 23 is a sectional view showing a further example (seventh embodiment) of the constitution of the polarization converting element.

FIG. 23 is a sectional view showing a still further example of the polarization converting element.

Figure 24:
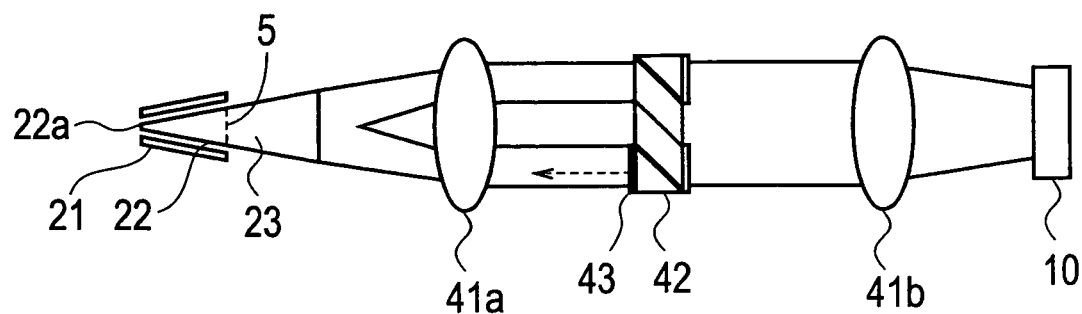
FIG. 24 is a sectional view showing the constitution of a light source device using the polarization converting element of FIG. 23.

FIG. 24 is a sectional view showing the constitution of a light source device using the polarization converting element of FIG. 23.

According to the seventh embodiment, the position of the lower polarization separating element 43 of FIG. 22, which does not lead the reflected light component to the lens 41b (FIG. 14), is altered to the front side of the polarization converting element 42. In detail, as shown in FIG. 23, the lower polarization separating element 43 is arranged in parallel to the fifth face 5 (FIG. 24). With this arrangement of the lower polarization separating element 43, S-polarized light is reflected to the incident side, while P-polarized light is transmitted through the element 43, as similar to the sixth embodiment. The so-reflected S-polarized light is returned to the optical element 22 through the lens 41a, as shown in FIG. 24. Then, the P-polarized light is reflected by the reflecting films on the back side of the solid light emitting elements 21, and subsequently emitted from the optical element 22. That is, according to the seventh embodiment, it is possible to make the light component, which has been transmitted through the polarization converting element 42 and therefore unused in the light source device in the sixth embodiment, incident on the element 42 again, and also possible to improve the light use efficiency in comparison with the sixth embodiment.

Also in this embodiment, the optical element 22 may be equipped with the light pipe 23 in succession to the fifth face 5, integrally.

8th. Embodiment of Light Source Device

Figure 25:
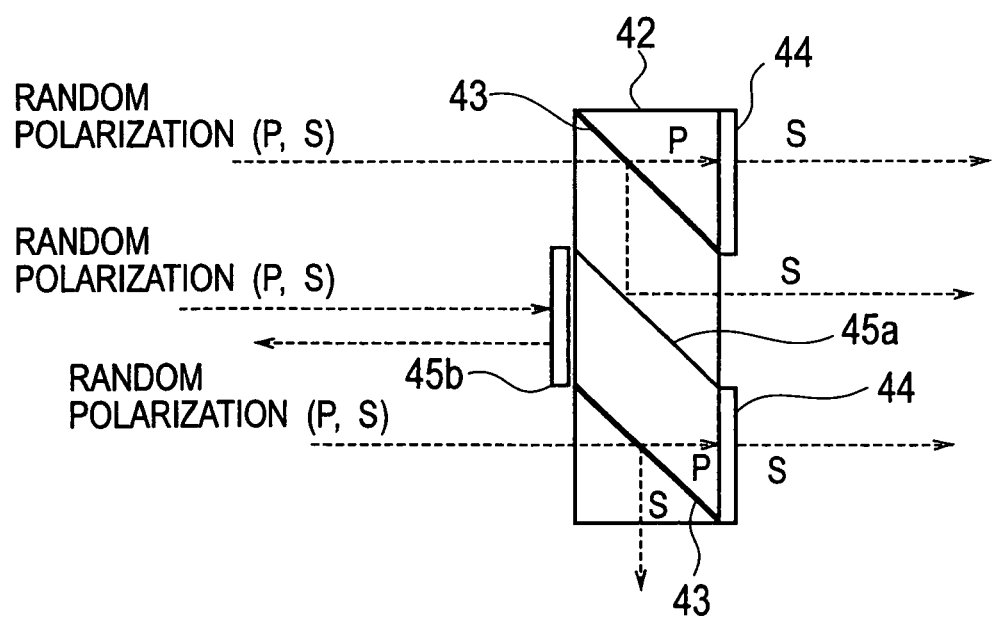
FIG. 25 is a sectional view showing the constitution of a polarization converting element having a reflecting surface in accordance with an eighth embodiment of the present invention.

FIG. 25 is a sectional view showing a further example of the polarization converting element.

In the light source device of the embodiment, as shown in FIG. 25, the polarization converting element 42 includes the polarization separating elements 43, the wave plates 44, the reflecting surface 45*a* and a reflecting plate 45*b*. Between the fifth face 5 of the optical element 22 (see FIG. 24) and the reflecting surface 45*a*, the reflecting plate 45*b* is arranged in parallel to the fifth face 5, and adapted so as to reflect light (i.e. random polarized light) from the optical element 22 and bring back.

On the reflecting plate 45*b*, there is formed a reflecting surface made from reflecting material or a microstructural reflecting part made from photonic crystal. Any one of Al (aluminum) film, Ag (silver) film and dielectric film is available as the reflecting material. When adopting Al film as the reflecting film, it has a reflectivity of approx. 92%. In forming Ag film, the resultant reflecting film has a reflectivity of approx. 98%.

In general, as mentioned before, light emitted from the optical element 22 having the sixth face is divided up and down in terms of the angle distribution, and respectively transmitted to the polarization separating elements 43 in the polarization converting element 42 through the lens 41*a*. The light components transmissive through the respective polarization separating elements 43 are further transmitted through the wave plates 44 for converting the polarization direction by 90 degrees, and emitted out of the polarization converting element 42. While, the light component reflected by the polarization separating element 43 is further reflected by the reflecting surface 45*a*, and emitted in parallel to the light components transmitted through the wave plates 44.

Figure 26:
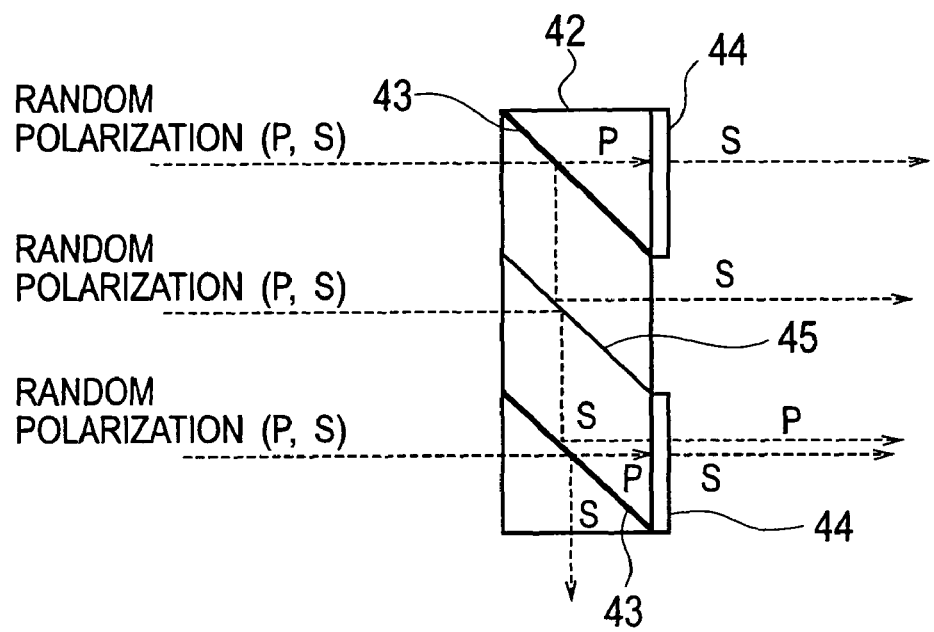
FIG. 26 is a sectional view showing the polarization converting element of FIG. 25 but it is provided with no reflecting surface.

Ideally, the light emitted from the optical element 22 is divided in two up and down completely. However, it is actual that partial light is remained in the center of the light source device, as shown in FIG. 19B. In such a situation, if the partial light is irradiated to the polarization converting element 42, then the partial light enters the backside of the reflecting surface 45 without being incident on the polarization separating elements 43, as shown in FIG. 26.

Due to no conversion in polarization, the light incident on the backside of the reflecting surface 45 cannot be utilized effectively. In addition, this incident light is reflected by both the back face of the reflecting surface 45 and the lower polarization on separating element 43, and successively emitted from the polarization converting element 42 through the wave plate 44 converting its polarization direction. For example, in the structure shown in FIG. 26, S-polarization component of the light incident on the backside of the reflecting surface 45 is converted to P-polarization component after being reflected by the back face of the reflecting surface 45 and the lower polarization separating element 43. Consequently, at the exit of the polarization converting element 42, P-polarization component is mixed with the emission light uniformed to S-polarization component, causing not only the light use efficiency but also the contrast of a display image to be reduced.

On the contrary, in the polarization converting element 42 equipped with the reflecting plate 45*b*, light being directing to the center of the polarization converting element 42 is reflected by the reflecting plate 45*b*, as shown in FIG. 25. As a result, the light cannot enter the back side of the reflecting surface 45*a*, allowing the contrast to be improved.

In addition, the light reflected by the reflecting plate 45*b* is returned to the optical element 22 through the lens. Then, the returned light is reflected by the reflecting films on the back side of the solid light emitting elements 21, and subsequently emitted from the optical element 22 again. That is, according to the eighth embodiment, it is possible to make the light, which would enter the center of the polarization converting element 42 of FIG. 26, incident on the element 42 again, and also possible to improve the light use efficiency.

Figure 27:
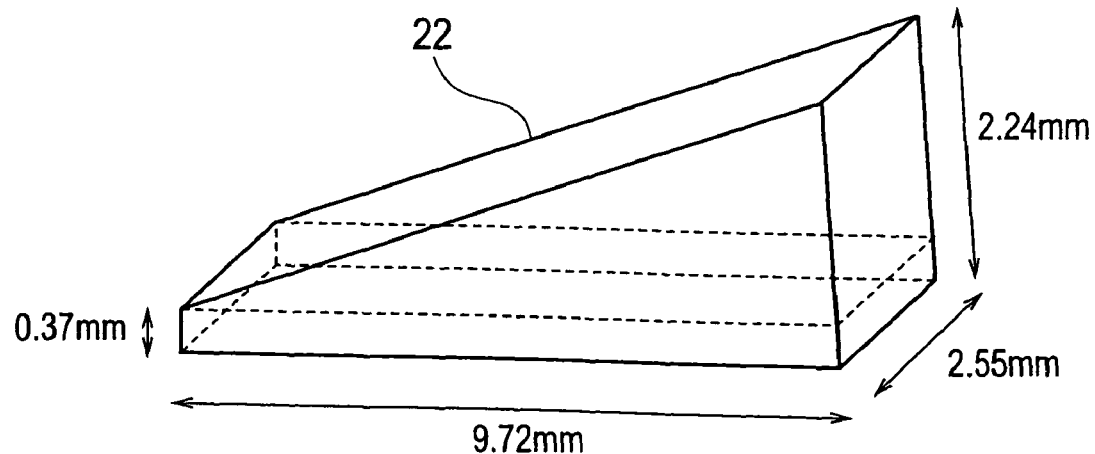
FIG. 27 is a perspective view showing the shape of an optical element of the eighth embodiment.
Figure 28:
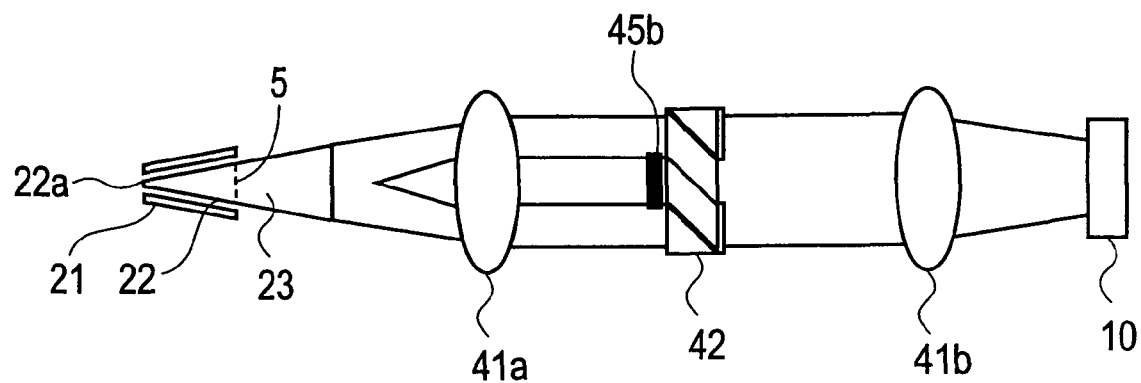
FIG. 28 is a side view showing the constitution of a lighting device of the eighth embodiment.
Figure 29:
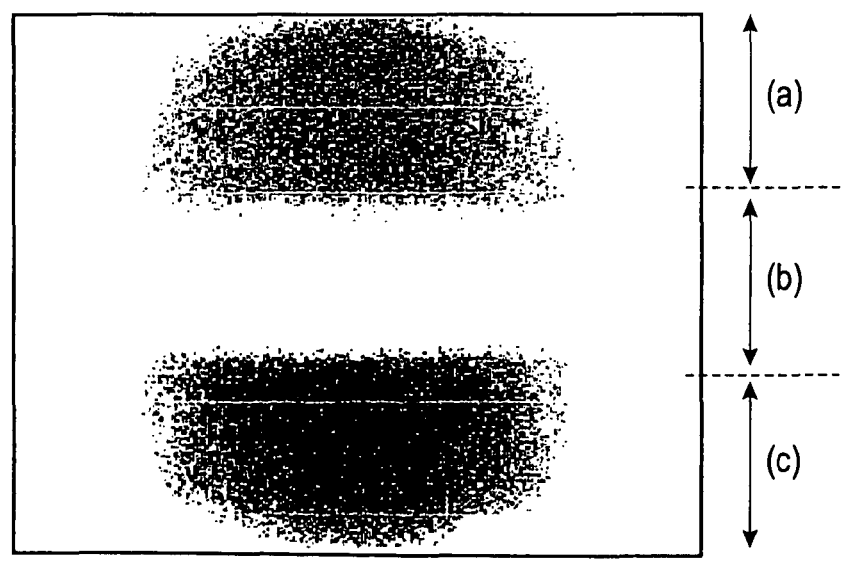
FIG. 29 is a front view showing the distribution of light intensity on the incident surface of a polarization converting element of the eighth embodiment.

Suppose that for instance, the optical element 22 having a shape shown in FIG. 27 is applied to a lighting device of FIG. 28. Then, light produced by the solid light emitting element 21 is emitted from the optical element 22, and enters the polarization converting element 42 through the lens 41*a*. The intensity distribution of light at the incident surface of the polarization converting element 42 is represented by FIG. 29. In FIG. 29, an area having high light intensity is illustrated with thick flecks, while an area having low light intensity is illustrated with thin flecks. From FIG. 29, it will be understood that the light intensity is elevated in both upper and lower areas (a), although some light also enters an intermediate area (b) between the upper area (a) and the lower area (a). We calculate the amount of light incident on the areas (a) and (b). The calculation result is as follows.

TABLE 2

| Incidence Quantum at Incident Surface of Element 42 | | | |
|---|---|---|---|
| luminescent Quantum from Element 21 | Incident Quantum (a + b) to Element 21 | Incident Quantum (b) to Reflecting Plate 45b | Ratio (b)/(a + b) |
| 100 | 80.23 | 7.76 | 9.7% |

Table 2 is premised on 70% in the reflectivity of the back surface of the solid light emitting element 21. Provided that the luminescent quantum from the solid light emitting element 21 is 100, the sum of incident quantities on the areas (a), (b) becomes 80.23 where the incident quantity on the area (b) becomes 7.76. Thus, the ratio of incident light on the area (b) to the above sum becomes 9.7%. Here, if the polarization converting element is provided with the above-mentioned structure of FIG. 26, the incident light of 9.7% on the area (b) cannot be used to reduce the brightness by just that much. Further, if such unused light is emitted to the outside without being converted in polarization, it would cause deterioration in the contrast.

According to the eighth embodiment, owing to the provision of the reflecting plate 45*b*, it is possible to allow the light of 9.7%, which is about to be incident on the area (b), to be reflected against a light source in view of reutilization, and also possible to improve both brightness and contrast of the light source device.

Also in this embodiment, the optical element 22 may be equipped with the light pipe 23 in succession to the fifth face 5, integrally.

Figure 30:
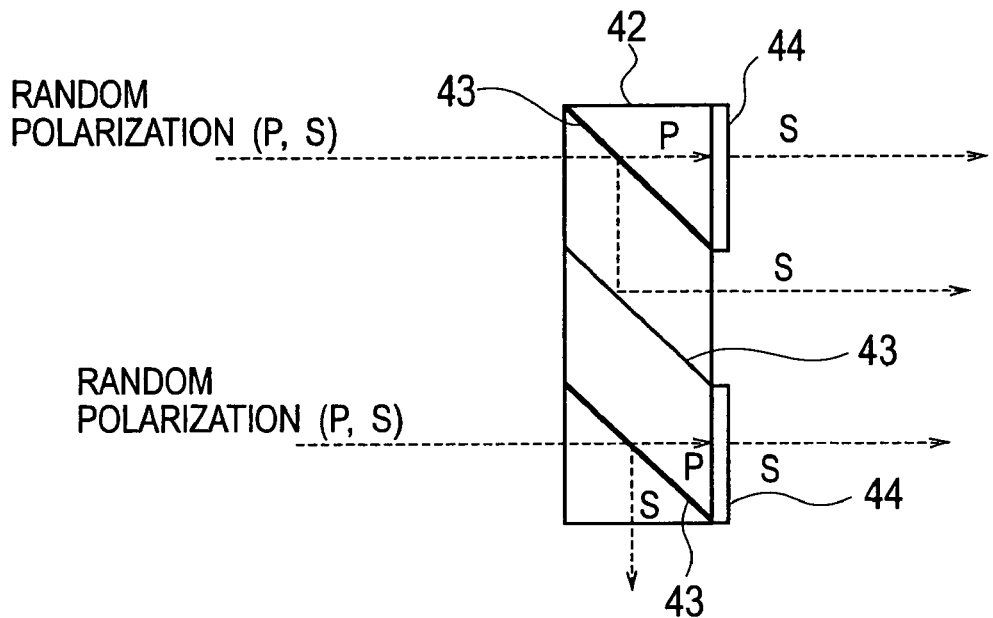
FIG. 30 is a side view showing the other constitution of the polarization converting element of the eighth embodiment.

FIG. 30 is a side view showing a still further constitution of the polarization converting element.

In this light source device, as shown in FIG. 30, the reflecting plate 45*b* of FIG. 25 may be formed by an element having the same optical characteristics as the polarization separating element. Although the light is reflected by the reflecting plate 45*b* in the previous embodiment, replacing of the reflecting plate (e.g. metal film, dielectric film, etc.) by a polarization separating element (e.g. reflection type polarization plate, polarization beam splitter, etc.) would produce similar results to the previous embodiments since respective lights are aligned in polarization.

Figure 31:
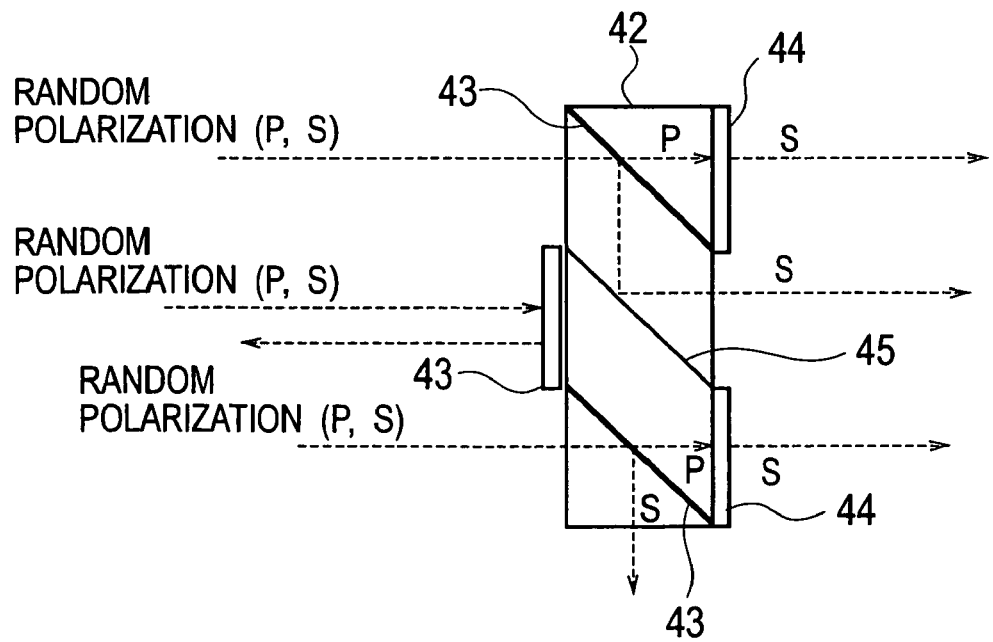
FIG. 31 is a side view showing a further constitution of the polarization converting element of the eighth embodiment.

FIG. 31 is a side view showing a still further constitution of the polarization converting element.

Further, as shown in FIG. 31, the polarization converting element 42 is provided, on its intermediate portion, with a polarization separating element 43 in place of the reflecting plate 45b of FIG. 25. Although the light is reflected by the reflecting plate 45b in the previous embodiment, replacing of the reflecting plate (e.g. metal film, dielectric film, etc.) by a polarization separating element (e.g. reflection type polarization plate, polarization beam splitter, etc.) would produce similar results to the previous embodiments since respective lights are aligned in polarization.

9th. Embodiment of Light Source Device

In the previously-mentioned embodiment, the provision of the edge part (the sixth face) of the optical element 22 allows light flux emitted therefrom to be divided in two, performing polarization and conversion while compressing etendue. Therefore, the light source device of the previously-mentioned embodiment is characterized by making the fifth face smaller than the light emitting face of the solid light emitting element 21. In connection, if the shape of the sixth face is not appropriate, it brings about the possibility of reducing the quantity of emission flux due to light leakage from the optical element 22, and deteriorating the light use efficiency at the optical system and the polarization conversion efficiency at the polarization converting element due to a mismatch of the radiation angle with an illumination optical system, so that the illuminating light quantity for the spatial light modulation element is lowered.

Simultaneously, as the optical element 22 of the previously-mentioned embodiment has a refractive index more than that of the circumferential medium, some emission light is not taken out of the element 22 through the fifth face but reflected by its boundary face. Such a phenomenon brings about the possibility of reducing the quantity of light flux emitted from the optical element 22, the illuminating light quantity for the spatial light modulation element is lowered as well.

For these reasons, the ninth embodiment of the present invention is directed against the appropriate formation of the sixth face and the increasing of the quantity of flux emitted from the optical element 22.

That is, according to this embodiment, the height (length) of the sixth face of the optical element 22 is set more than 1 mm and less than half of the height of the fifth face. The establishment of the sixth face more than 1 mm in height could get rid of restrictions of production to facilitate the production of the optical element 22. By setting the sixth face less than half of the height of the fifth face, meanwhile, it is possible to prevent an occurrence of practical interferences as there is no possibility of increasing a distance between light fluxes divided in half.

It is desirable to maintain the following relationship for respective heights of the fifth and sixth faces:

[fifth face's height]:[sixth face's height]=[fluxes' length on Polarization Converting Element 42 in its cross-sectional direction]:[distance between fluxes on Polarization Converting Element 42].

Figure 32:
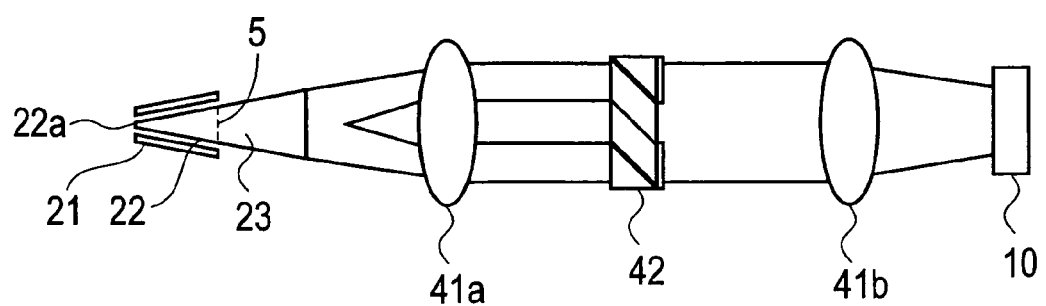
FIG. 32 is a side view showing the constitution of a light source device in accordance with a ninth embodiment of the present invention.
Figure 33:
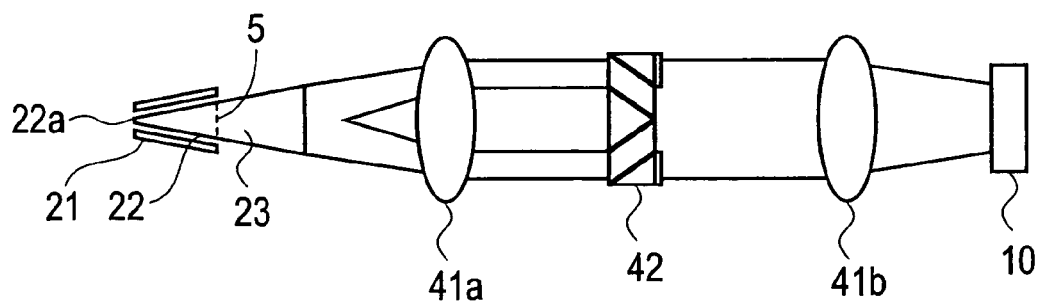
FIG. 33 is another side view showing the constitution of a light source device in accordance with a ninth embodiment of the present invention.

FIGS. 32 and 33 are side views showing the light source device in accordance with this embodiment.

Light emitted from the solid light emitting element 21 enters the optical element 22 through its first face. Then, after being reflected by any of the first to fourth faces and the reflecting film of the element 21 (or with no reflection from these faces and the reflecting film), the light is emitted to the outside through the fifth face smaller than the area of the light emitting face, and enters the polarization converting element that combines the light upon polarization conversion. Consequently, with the improved light use efficiency, it is possible to improve the brightness of illumination light dominant for light source etendue.

Also in this embodiment, the optical element 22 may be equipped with the light pipe 23 in succession to the fifth face 5, integrally.

10th. Embodiment of Light Source Device

In this embodiment, the light pipe 23 is arranged in succession to the fifth face of the optical element 22 and additionally, it is formed so that the angle between the first face and the fourth face is more than 25 degrees and less than 45 degrees in order to increase the total reflection while reducing the dependency of the solid light emitting element 21 on its reflectivity. However, it should be noted that there is a possibility of increasing etendue remarkably.

It is thought to make the dimensions of the solid light emitting element 21 smaller in order to suppress the whole etendue. However, if making the dimensions of the solid light emitting element 21 smaller, the light itself generated from the optical element 22 is decreased since the solid light emitting element 21 has a fixed amount of luminescence per unit area.

Figure 34:
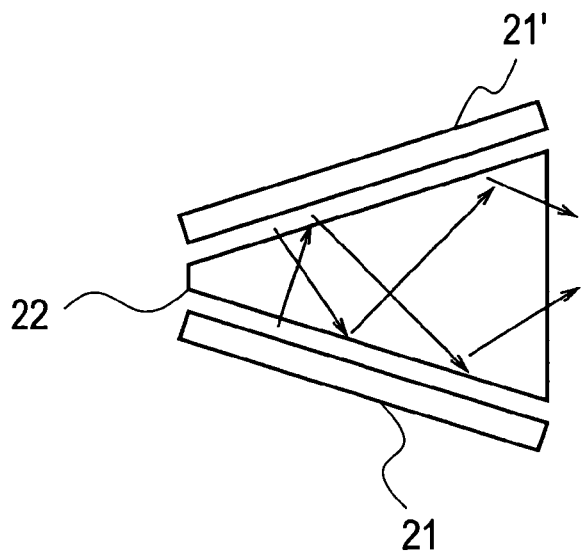
FIG. 34 is a side view showing the constitution of a light source device in accordance with a tenth embodiment of the present invention.

According to this embodiment, as shown in FIG. 34, a second solid light emitting element 21' is arranged so as to depart from the fourth face of the optical element 22 through a gap, in addition to the solid light emitting element 21. Owing to the provision of the additional solid light emitting element, it is possible to maintain the output from the optical element 22 despite that the light emitting faces of the solid light emitting elements 21, 21' are reduced in order to suppress etendue.

In addition, by making of the angle between the first face and the fourth face more than 25 degrees and less than 45 degrees, it is possible to increase the quantity of light flux emitted from an exit opening of the light pipe 23 with the reduction of flux to be returned to the solid light emitting elements 21, 21' in themselves.

Thus, according to this embodiment, the total output of the system is increased remarkably since the etendue of the optical system is suppressed.

FIG. 34 shows the constitution of the light source device of this embodiment.

In this embodiment, as shown in FIG. 34, the solid light emitting elements 21, 21' are arranged so as to oppose both of the first face and the fourth face of the optical element 22. Since the solid light emitting elements 21, 21' mutually utilize each other as the reflecting surface, there is produced no change in etendue in comparison with that of the light source device using a single solid light emitting element. In spite of the same etendue, the light source device of this embodiment is remarkably improved in its brightness, although it depends on the reflectivity of the solid light emitting elements 21, 21'.

Figure 35:
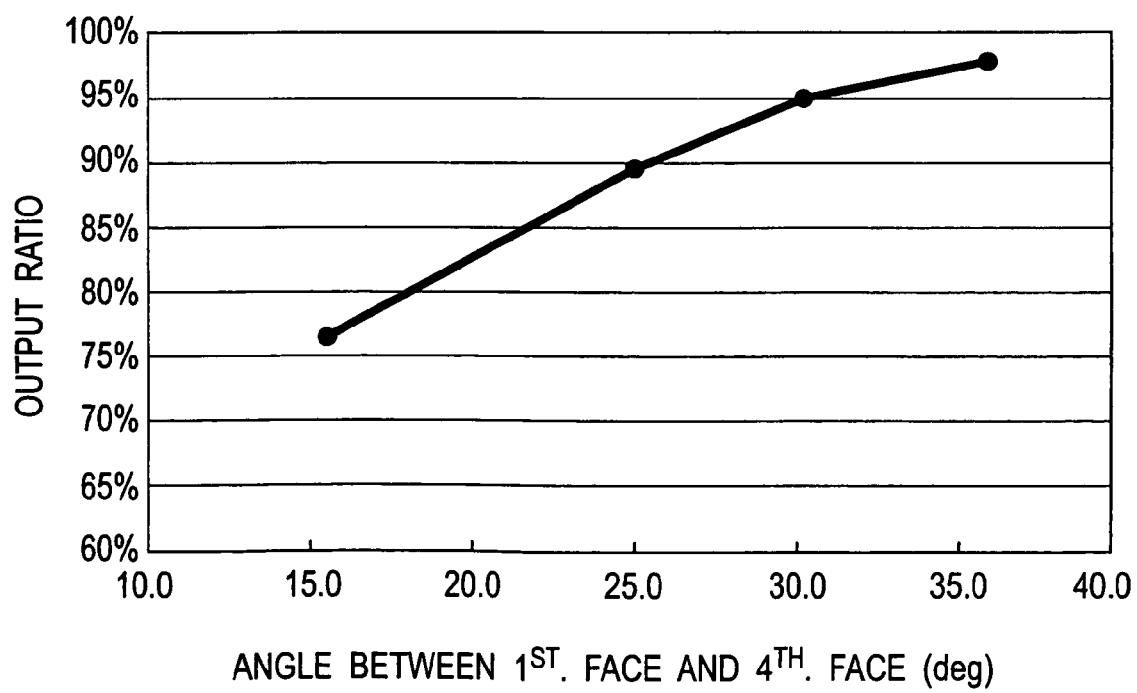
FIG. 35 is a graph showing the effect of reducing the reflectivity dependency of a solid light emitting element of the tenth embodiment.

In connection with this embodiment, FIG. 35 is a diagram showing the effect of reducing the dependence property on the reflectivity of the solid light emitting elements 21, 21'. Suppose that the angle between the first face and the fourth face is more than 25 degrees in the optical element 22. Then, even if the reflectivity of the solid light emitting elements 21, 21' is 30% each, it is possible to ensure an output equal to 90% of the output of the light source device using the solid light emitting elements 21, 21' of 55% in reflectivity. If only the angle between the first face and the fourth face is more than 45 degrees, the dependence property on the reflectivity of the solid light emitting elements 21, 21' can be excluded generally.

11$^{th}$. Embodiment of Light Source Device

Figure 36:
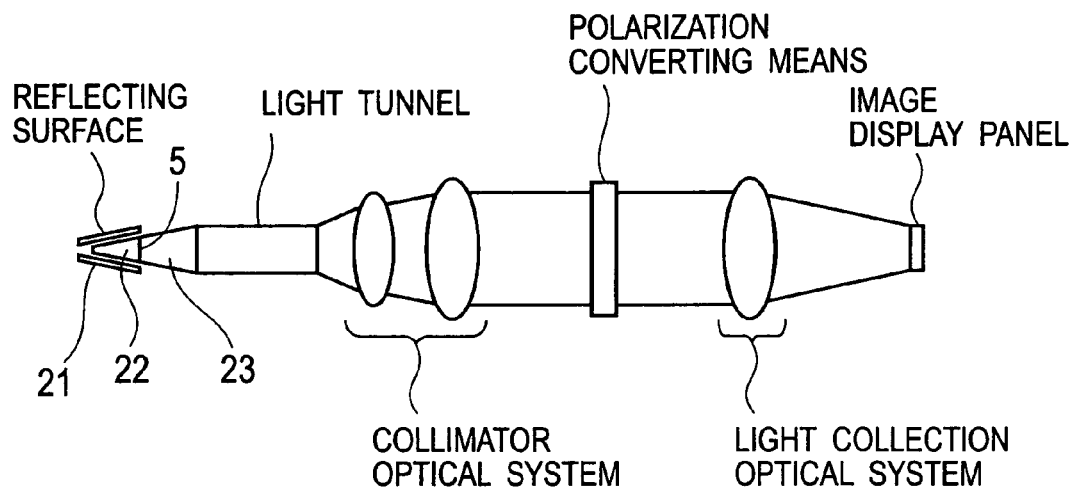
FIG. 36 is a side view showing the constitution of a light source device in accordance with an eleventh embodiment of the present invention.

FIG. 36 shows the eleventh embodiment of the present invention The eleventh embodiment of the present invention is directed to an increase in total reflection and a reduction in the dependence property on the reflectivity of the solid light emitting element 21 with the structure where the light pipe 23 is arranged in succession to the fifth face of the optical element 22 integrally, and its angle between the first face and the fourth face is set more than 25 degrees and less than 45 degrees.

The efficiency of polarization conversion is dependent on the angle distribution of light incident on a polarization converting element. In the previously-mentioned embodiment, the light incident on the polarization converting element is divided to two fluxes each having a great angle, causing a deterioration of the efficiency of polarization conversion.

In addition, there is a possibility that a variation in etendue derived from the dimensional variation of the optical element 22 has a great influence on the efficiency of the optical system.

According to this embodiment, by making the angle of the optical element 22 between the first face and the fourth face more than 25 degrees and less than 45 degrees, it is possible to reduce the flux getting back to the solid light emitting element 21 to itself and therefore, it is possible to increase the quantity of light flux emitted from the exit opening of the light pipe 23.

A light tunnel is arranged on the exit face of the light pipe 23. In operation, the light tunnel is adapted so as to segment light flux into four or more fluxes due to multiple reflection. Thus, as the angle characteristics for the polarization converting element is alleviated by the light tunnel, it is possible to improve of the efficiency of polarization conversion.

The light tunnel is formed by a hollow cylindrical member whose inner surface is coated with a reflecting film, and provided with rectangular incident and exit faces. As the reflecting material, there is available, Al (aluminum) film, Ag (silver) film, dielectric film or microstructural reflecting part composed of photonic crystal, although there is no limitation in selecting the material for the cylindrical part. If adopting Al film as the reflecting film, the reflectivity becomes approx. 92%. If adopting Ag film as the reflecting film, the reflectivity becomes approx. 98%.

Owing the provision of the light tunnel, even if the dimensions of the optical element 22 are dispersed so as to increase its etendue, it is possible to maintain the etendue of an optical system constant, allowing a variation in efficiency to be restricted remarkably.

In the light source device of the eleventh embodiment, as shown in FIG. 36, the flux, which has been multiply-reflected in the light tunnel and emitted therefrom, is collimated and separated into four or more fluxes. These fluxes are subsequently converted in polarization by a polarization converting element incorporating four or more polarizing beam splitters (PBS) in strips.

That is, as the angle of light incident on each polarization separating element of the polarization converting element is remarkably decreased in comparison with the angles of two fluxes obtained in a situation having no light tunnel, the efficiency of the polarization converting element can be improved remarkably.

Figure 37:
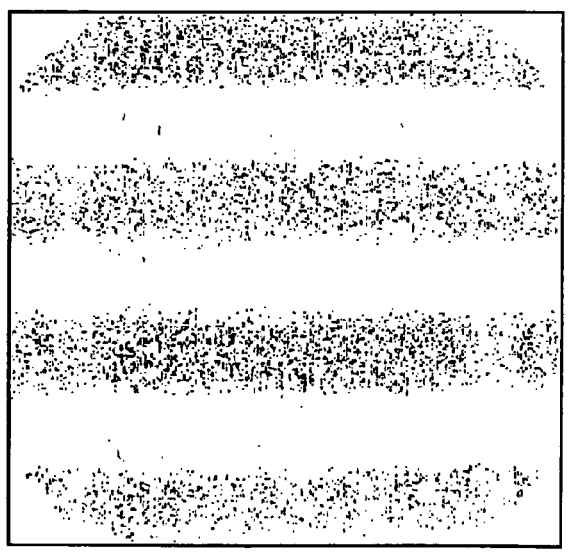
FIG. 37 is a front view showing the distribution of light intensity on the incident surface of a polarization converting element of the eleventh embodiment.
Figure 37:
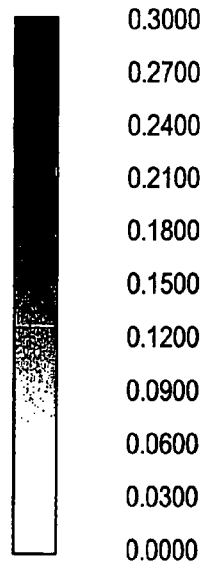

FIG. 37 shows the distribution of light intensity (illuminance distribution) on the incident surface of the polarization converting element. From the figure, it will be understood that the flux incident on the polarization converting element is separated into four fluxes.

Thus, by combining the light pipe 23, the light tunnel and the collimator with the optical element 22, it is possible to form a reed-shaped (in lateral stripes) eye-distribution, and also possible to realize high-efficiency polarization conversion through the polarization converting element. By increasing the number of strips in the polarization converting element, the angle characteristics for the polarization converting element is alleviated to improve the light use efficiency. Now, the proportion of [flux area]:[no flux area]:[flux area] becomes 1:2:1.

In connection with this embodiment, FIG. 35 is a diagram showing the effect of reducing the dependence property on the reflectivity of the solid light emitting element 21. Suppose again that the angle between the first face and the fourth face is more than 25 degrees in the optical element 22. Then, even if the reflectivity of the solid light emitting element 21 is 30%, it is possible to ensure an output equal to 90% of the output of the light source device using the solid light emitting element 21 of 55% in reflectivity. If only the angle between the first face and the fourth face is more than 45 degrees, the dependence property on the reflectivity of the solid light emitting element 21 can be excluded generally.

Here, it is noted that the reflectivity of the solid light emitting element 21 is located at the level of 30% in current actual value and 55% in theoretical value (assumable maximum reflectivity) (both reflectivity: in case of a red solid light emitting element). Although the reflectivity of the solid light emitting element 21 varies depending on its color (RGB), red is the most lacking color in adjusting the white balance. Therefore, we are putting importance on the reflectivity of a red solid light emitting element 21 in order to realize an optimum red.

Note that the reflectivity of the solid light emitting element 21 on a current commercial basis is low. If a certain solid light emitting element were provided with high reflectivity, there would be no need of adopting the present invention and instead, a conventional system using an optical element having no sixth face (for example, one disclosed in Japanese Patent Application No. 2006-296591) would be applicable. On the contrary, the present invention is effective in a system with a solid light emitting element having a low reflectivity. That is, the present invention is intended to an optical system which could afford an optical output as if it used a solid light emitting element having a high reflectivity and which has an intensity of emission light independent on the reflectivity of the solid light emitting element on use (or with a small effect by the reflectivity of the solid light emitting element on use). Therefore, in the graph, we compares one reflectivity of 30% as being a current practical value with another reflectivity of 55% as being a theoretical value. That is, it is thought that the smaller a difference in optical output in between one system using the former solid light emitting element (reflectivity: 30%) and another system using the later solid light emitting element (reflectivity: 55%) gets, the closer the present invention does approach the above objects, and therefore, we are comparing the system of the present invention with the conventional system through the parameter of an output ratio (vertical axis in FIG. 35).

From FIG. 35, it will be understood that as the angle gets larger, the output ratio is increased close to 100%. On the other hand, when the angle gets smaller, the output ratio is reduced gradually. Further, when the angle gets smaller than 25 degrees (output ratio: 90%), the output ratio is reduced remarkably. Here, we are selecting, as a lower limit, an angle of 25 degrees enabling the output ratio of 90% to be maintained. In connection, it should be noted that the above definition (of 25 degrees) is nothing but exhibiting a standard accomplishing the output of 90%, and we don't mean the establishment of 24 or 26 degrees would not come into effect.

When the angle is increased to approximate 45 degrees, the output ratio becomes about 100%, so that more increasing in the angle would not conduce a great change in the output ratio. In the optical element 22 formed with an angle (between the first face and the fourth face) close to 45 degrees, after incident light is reflected from the fourth face or the reflecting surface, almost all light is emitted from the fifth face 5 (without being returned to the solid light emitting element 21). Getting relief from the dependency on the reflectivity of the solid light emitting element 21, even if using the solid light emitting element 21 of low reflectivity, it is possible to obtain an optical output similar to that in case of adopting the solid light emitting element 21 of high reflectivity.

From these reasons, according to the embodiment, there are adopted conditions: from 25 to 45 degrees as the angle between the first face and the fourth face; and 30% and 55% as the reflectivity of the solid light emitting element 21.

12$^{th}$. Embodiment of Light Source Device

The previously-mentioned embodiment has a problem that the light flux emitted from the optical element 22 is dependent on the reflectivity of the solid light emitting element 21 to a great extent as there exists much light reflected by the reflecting film of the solid light emitting element 21. Therefore, the twelfth embodiment of the present invention is directed to an increase in total reflection and a reduction in the dependence property on the reflectivity of the solid light emitting element 21 with the structure where the light pipe 23 is arranged in succession to the fifth face of the optical element 22 integrally, and its angle between the first face and the fourth face is set more than 25 degrees and less than 45 degrees.

According to this embodiment, by making the angle of the optical element 22 between the first face and the fourth face more than 25 degrees and less than 45 degrees, it is possible to reduce the flux getting back to the solid light emitting element 21 to itself and therefore, it is possible to increase the quantity of light flux emitted from the exit opening of the light pipe 23.

Figure 38:
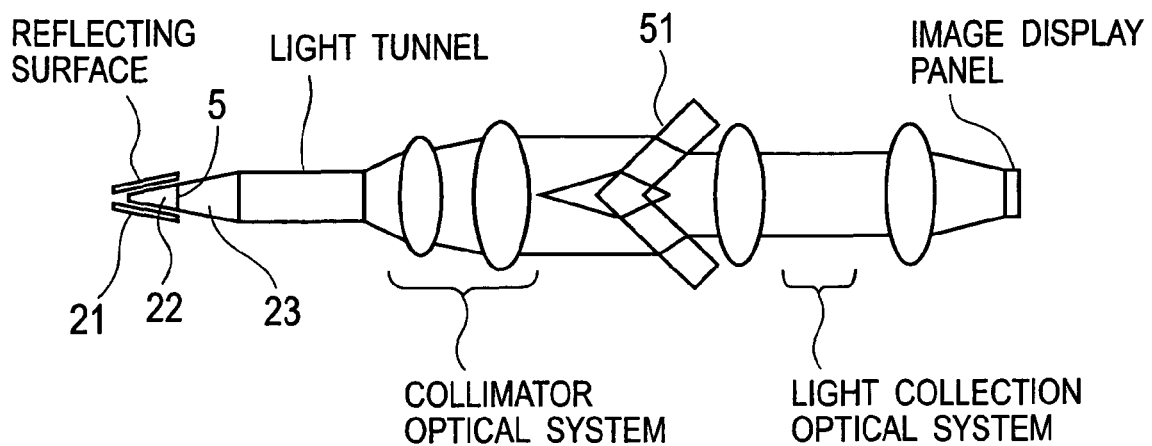
FIG. 38 is a side view showing the constitution of a light source device in accordance with a twelfth embodiment of the present invention.

In this embodiment, as shown in FIG. 38, the flux emitted from the optical element 22 and successively collimated is divided to two fluxes having an increased etendue. Then, these fluxes are brought to lumen compression means 51 consisting of a V-shaped glass to move two fluxes closer to each other, compressing the etendue.

Figure 40:
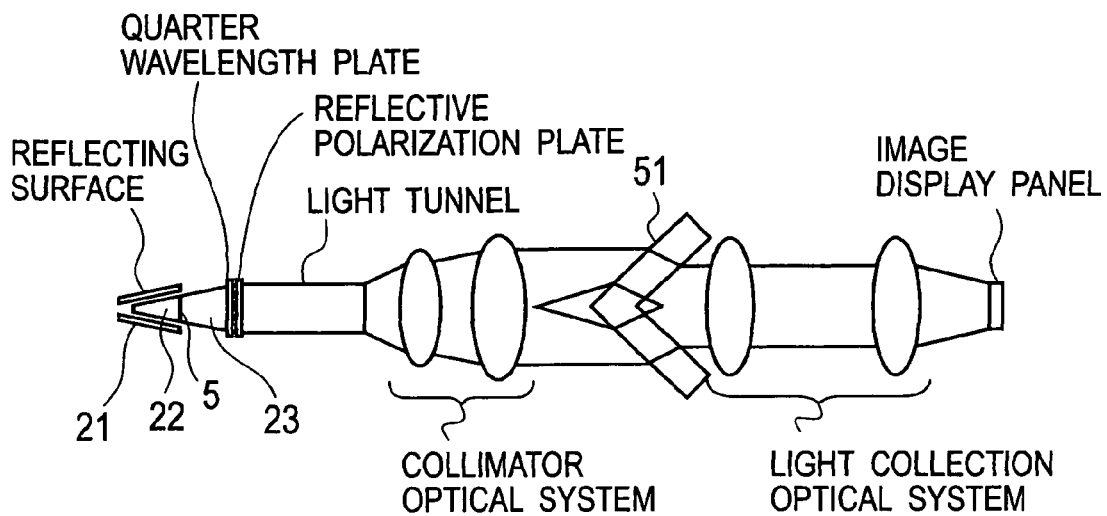
FIG. 40 is a side view showing the other constitution of the light source device of the twelfth embodiment.

Note that if the polarization conversion is required, there may be arranged either a reflective polarization plate or a combination of a reflective polarization plate and a quarter-wave plate on an exit end face of the light pipe 23 or an optical path of emission light. FIG. 40 shows an embodiment where the quarter-wave plate and the reflective polarization plate are arranged on the exit end face of the light pipe 23.

Unnecessary polarized light reflected by the reflective polarization plate is transmitted through the light pipe 23 and the optical element 22, and returned to the solid light emitting element 21. Continuously, the light is reflected by the surface of the solid light emitting element 21, and returned to the reflective polarization plate again. During this process, the reflected light is transmitted through the quarter-wave plate twice. Consequently, as the phase of the reflected light is turned by 90 degrees in total and changed to a usable polarized light, it is possible to improve the light use efficiency.

Figure 39:
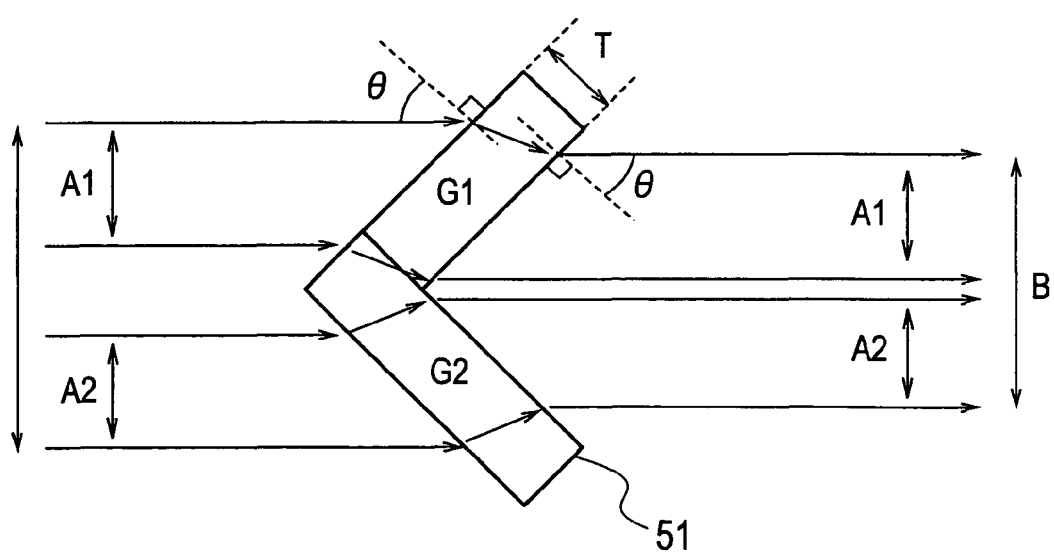
FIG. 39 is a side view showing the constitution of a flux compressing means of the twelfth embodiment.

As shown in FIG. 39, the lumen compression means 51 has two parallel flat glass plates G1, G2 arranged in a V-shaped manner. In the lumen compression means 51, each of the glass plates G1, G2 has the character of shifting the position of light beams while maintain the relationship of [incident angle=exit angle] under condition that an incident angle θ of light entering is nearly equal to zero (i.e. incident angle θ≈0). Therefore, two fluxes having widths A1, A2 are together shifted in directions shown with arrows, and emitted from the lumen compression means 51. Then, if representing a thickness of the glass plate by "T" and its refractive index by "n", then a shift amount H is expressed by $$H=(T(n-1)/2n)\times\sin 2\theta.$$

Comparing with the full width A of the incident light flux, consequently, the full width B of the emission light becomes A−2H (i.e. the relationship of [B=A−2H<A]), whereby the width of emission light flux can be compressed in comparison with the width of incident light flux.

Also in this embodiment, as shown in FIG. 35, the effect of reducing the dependency on the reflectivity of the solid light emitting element 21 is obtained. Under condition that the angle of the optical element 22 between the first face and the fourth face is more than 25 degrees, even if the reflectivity of the solid light emitting element 21 is 30%, there would be obtained an output equal to 90% of the output obtained in adopting the solid light emitting element 21 having 55% in reflectivity. If only the angle between the first face and the fourth face exceeds 40 degrees, the dependency on the reflectivity of the solid light emitting element 21 could be excluded generally.

Embodiment of Image Display Device

Figure 41:
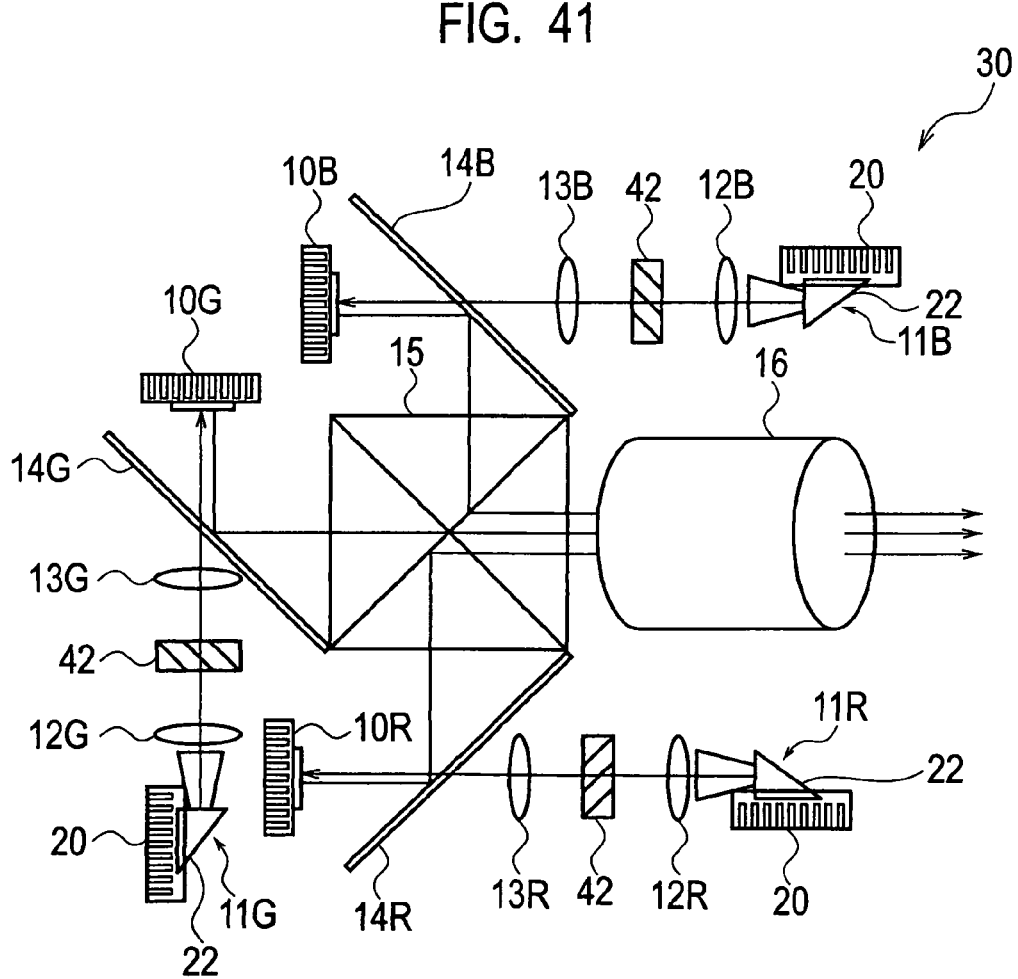
FIG. 41 is a plan view showing the constitution of an image display device in accordance with an embodiment of the present invention.

FIG. 41 is a plan view showing a constitution of an image display device 30 in accordance with an embodiment of the present invention.

As shown in FIG. 41, the image display device 30 comprises light source devices 11R, 11G and 11B mentioned above, spatial light modulating elements 10R, 10G and 10B illuminated by lights emitted from the light source devices 11R, 11G and 11B and an imaging optics system (e.g. a projection lens 16). The imaging optics system receives lights through the elements 10R, 10G and 10B and focuses into an image from images of the elements 10R, 10G and 10B. That is, this image display device 30 is provided to illuminate the spatial light modulating elements 10R, 10G and 10B by the corresponding light source devices 11R, 11G and 11B, and produce a color image as a result of color combination of respective modulation lights via the light modulating elements 10R, 10G and 10B.

Supposing that, for example, the light source devices 11R, 11G and 11B employ fine structures composed of photonic crystals as the reflecting parts, the reflecting part in the light source device 11R emitting red light is adapted so as to reflect the red light (R). Similarly, the reflecting part in the light source device 11G emitting green light is adapted so as to reflect the green light (G), while the reflecting part in the light source device 11B emitting blue light is adapted so as to reflect the blue light (B).

The "reflection-type" spatial light modulating elements 10R, 10G and 10B display red, green and blue components forming a display image, and modulate illumination lights corresponding to these images in polarization, respectively. In this embodiment, each of the spatial light modulating elements 10R, 10G and 10B reflects incoming illumination light upon polarization modulation.

As mentioned before, each of the light source devices 11R, 10G and 11B includes the solid light emitting element 21 and the optical element 22 having the first to six faces. In common with the light source devices 11R, 11G and 11B, the solid light emitting element 21 is arranged on the heat sink 20.

In connection, the above-mentioned light pipe 23 may be arranged in succession to the fifth face 5 of the optical element 22 integrally.

In operation, the light source device 11R emits red illumination light thereby to illuminate the spatial light modulating element 10R for displaying a red-component image. Similarly, the light source device 11G emits green illumination light thereby to illuminate the spatial light modulating element 10G for displaying a green-component image. The light source device 11B emits blue illumination light thereby to illuminate the spatial light modulating element 10B for displaying a blue-component image.

The illumination light emitted from the light source device 11R is transmitted to the spatial light modulating element 10R through a relay lens 12R, the polarization converting element 42, a field lens 13R and a wire grid 14R. Next, the red illumination light is reflected by the reflective spatial light modulating element 10R upon polarization modulation corresponding to signals for the red-component image, and further reflected by the wire grid 14R. In this way, the resultant red image light enters a color composition prism 15.

The illumination light emitted from the light source device 11B is transmitted to the spatial light modulating element 10B through a relay lens 12B, the polarization converting element 42, a field lens 13B and a wire grid 14B. Next the blue illumination light is reflected by the reflective spatial light modulating element 10B upon polarization modulation corresponding to signals for the blue-component image, and further reflected by the wire grid 14B. In this way, the resultant blue image light enters the color composition prism 15.

The illumination light emitted from the light source device 11G is transmitted to the spatial light modulating element 10G through a relay lens 12Q the polarization converting element 42, a field lens 13G and a wire grid 14G. Next, the green illumination light is reflected by the reflective spatial light modulating element 10G upon polarization modulation corresponding to signals for the green-component image, and further reflected by the wire grid 14G. In this way, the resultant green image light enters the color composition prism 15.

In the color composition prism 15, the red, green and blue image lights are combined in color, and subsequently enter the projection lens 16 forming the imaging optics system. The projection lens 16 projects the image lights in respective colors on a not-shown screen, and focuses into an image in enlargement, accomplishing an image displaying.

Finally, it will be understood by those skilled in the art that the foregoing descriptions are nothing but embodiments and various modifications of the disclosed light source device, the lighting device and the image display device and therefore, various changes and modifications may be made within the scope of claims.

What is claimed is:

1. A light source device comprising:
a solid light emitting element provided as a surface emitting source, the solid light emitting element having a reflecting film arranged on the back side of the solid light emitting element and a light emitting face arranged on the front side of the solid light emitting element;
an optical element having a first face opposed to the light emitting face of the solid light emitting element through a gap, second and third faces opposing in parallel to each other and both substantially perpendicular to the first face, a fourth face substantially perpendicular to the second and third faces and also obliquely-opposed to the first and a fifth face having a rim formed by respective one side edges of the first to fourth faces the optical element defining a polyhedron surrounded by the first to fifth faces and also filled up with a medium having a refractive index more than a refractive index of a circumferential medium surrounding the optical element; and
a polarization converting element having an incident surface opposing in substantially-parallel to the fifth face through a space whose refractive index is equal to or less than the refractive index of the medium forming the optical element, the polarization converting element comprising a polarization separating element for polarization-separating flux entering from the optical element to the incident surface, a first reflecting surface for reflecting one of fluxes separated in polarization and a wave plate for converting either of phases of the fluxes separated in polarization, wherein:
the fifth face of the optical element is formed with an area smaller than an area of the light emitting face,
whereby light generated from the solid light emitting element enters the optical element through the first face, and is emitted to an outside through the fifth face and subsequently,
the light enters the polarization converting element where the polarization of the light is converted and combined, and
wherein the optical element further includes a sixth face opposed to the fifth face and having a rim formed by respective other side edges of the first to fourth faces.

2. The light source device of claim 1, further comprising a second reflecting surface arranged in substantially-parallel to the fourth face through a minute space, wherein the minute space is filled up with a medium whose refractive index is less than the refractive index of the medium filling the inside of the optical element.

3. The light source device of claim 2, further comprising a support for carrying the second reflecting surface, wherein the support is provided with a cooling mechanism.

4. The light source device of claim 1, further comprising, as another surface emitting source, a second solid light emitting element arranged in substantially-parallel to the fourth face through a minute space, wherein
the second solid light emitting element has a reflecting film arranged on the back side of the second solid light emitting element and a light emitting face arranged on the front side of the second solid light emitting element; and
the minute space is filled up with a medium whose refractive index is less than the refractive index of the medium filling the inside of the optical element.

5. The light source device of claim 1, further comprising at least one lens arranged between the fifth face of the optical element and the polarization converting element.

6. The light source device of claim 1, wherein
the polarization converting element includes at least two polarization separating elements and a least one reflecting surface,
the polarization separating elements and the reflecting surface are arranged in substantially parallel to each other and obliquely to the fifth face by approximately 45 degrees, and
the wave plate is arranged in a position on the opposite side of the fifth face, with respect to each of the polarization separating elements.

7. The light source device of claim 1, wherein
the polarization converting element includes at least two polarization separating elements and a least one reflecting surface, and
at least one of the polarization separating elements is arranged in substantially parallel to the fifth face.

8. The light source device of claim 1, wherein the fourth face is formed with a reflecting surface made from reflecting material or a microstructural reflecting part composed of photonic crystal.

9. The light source device of claim 1, wherein the fourth face is formed by a curved surface.

10. The light source device of claim 1, wherein
the fourth face is divided into a first face part close to the fifth face and a second face part far from the fifth face, which interpose an inflection point therebetween,
the first face part is cylindrical-shaped so as to be concave toward the first face, and
the second face part is cylindrical-shaped so as to be convex toward the first face.

11. The light source device of claim 1, wherein the reflecting surface of the polarization converting element has the same reflection characteristics as that of the polarization separating element.

12. The light source device of claim 1, wherein the polarization converting element further includes at least one reflecting surface arranged between the reflecting surface of the polarization converting element and the fifth face, in substantially parallel to the fifth face.

13. The light source device of claim 1, wherein the sixth face has a height equal to or more than 1 mm and less than half the height of fifth face.

14. The light source device of claim 1, wherein a gap between the surface of the solid light emitting element and the optical element is filled up with a medium whose refractive index is less than the refractive index of the medium filling the inside of the optical element.

15. The light source device of claim 1, wherein the second face and the third face are inclined to a plane perpendicular to the first face equal to or more than 1 degree.

16. The light source device of claim 1, wherein the optical element is shaped so that an angle defined between the first face and the fourth face is equal to or more than 25 degrees and less than 45 degrees.

17. The light source device of claim 1, further comprising a light pipe made from a medium whose refractive index is equal to or more than that of the medium filling the inside of the optical element, wherein
the light pipe is arranged in succession to the fifth face of the optical element integrally,
the light pipe is tapered so as to increase its diameter as departing from the optical element, and
the light pipe has its leading face arranged in parallel to the fifth face to form an exit end face.

18. The light source device of claim 17, further comprising either a reflective polarization plate or a combination thereof with a quarter-wave plate arranged on the exit end face of the light pipe.

19. A lighting device comprising:
a light tunnel into which flux emitted from the light pipe of the light source device of claim 17 enter, the light tunnel multiply-reflecting the flux;
a collimator optical system for collimating the flux emitted from the light tunnel thereby to divide the flux into four or more fluxes;
a polarization converting element for converting the four or more fluxes in polarization; and
a light collection optical system for collecting the fluxes emitted from the polarization converting element thereby to form an image of an exit face of the light pipe.

20. The lighting device of claim 19, wherein
the polarization converting element includes at least four polarization separating elements,
the polarization separating elements are arranged in substantially parallel to each other and obliquely to the fifth face by approximately 45 degrees, and
the wave plate is arranged in a position on the opposite side of the fifth face, with respect to each of the polarization separating elements.

21. An image display device comprising:
the light source device of claim 1;
a spatial light modulating element illuminated by light emitted from the light source device;
an imaging optics into which the light transmitted through the spatial light modulating element enters and which forms an image of the spatial light modulating element; and
a light pipe made from a medium whose refractive index is equal to or more than that of the medium in the optical element, wherein
the light pipe is arranged in succession to the fifth face of the optical element integrally, the light pipe is tapered so as to increase its diameter as departing from the optical element, and
the light pipe has its leading face arranged in parallel to the fifth face to form an exit end face.

22. A light source device comprising:
a solid light emitting element provided as a surface emitting source, the solid light emitting element having a reflecting film arranged on the back side of the solid light emitting element and a light emitting face arranged on the front side of the solid light emitting element;
an optical element having a first face opposed to the light emitting face of the solid light emitting element through a gap, second and third faces opposing in parallel to each other and both substantially perpendicular to the first face, a fourth face substantially perpendicular to the second and third faces and also obliquely-opposed to the first face, a fifth face having a rim formed by respective one side edges of the first to fourth faces the optical element defining a polyhedron surrounded by the first to fifth faces and also filled up with a medium having a refractive index more than a refractive index of a circumferential medium surrounding the optical element; and
lumen compression means for shifting respective beams' positions of two fluxes emitted from the optical element while maintaining the directions of the fluxes thereby to moving the fluxes closer to each other, wherein:
the fifth face of the optical element is formed with an area smaller than an area of the light emitting face, whereby light generated from the solid light emitting element enters the optical element through the first face and is emitted to an outside through the fifth face, in the form of the two fluxes, and subsequently, the light enters the lumen compression means where the two fluxes is combined into one flux.

23. The light source device of claim 22, further comprising a second reflecting surface arranged in substantially-parallel to the fourth face through a minute space, wherein the minute space is filled up with a medium whose refractive index is less than the refractive index of the medium filling the inside of the optical element.

24. The light source device of claim 22, further comprising, as another surface emitting source, a second solid light emitting element arranged in substantially-parallel to the fourth face through a minute space, wherein the second solid light emitting element has a reflecting film arranged on the back side of the second solid light emitting element and a light emitting face arranged on the front side of the second solid light emitting element; and the minute space is filled up with a medium whose refractive index is less than the refractive index of the medium filling the inside of the optical element.

25. The light source device of claim 23, further comprising a support for carrying the second reflecting surface, wherein the support is provided with a cooling mechanism.

26. The light source device of claim 22, wherein the optical element is shaped so that an angle defined between the first face and the fourth face is equal to or more than 25 degrees and less than 45 degrees.

27. The light source device of claim 22, further comprising at least one lens arranged between the fifth face of the optical element and the polarization converting element.

28. The light source device of claim 22, wherein the fourth face is formed with a reflecting surface made from reflecting material or a microstructural reflecting part composed of photonic crystal.

29. The light source device of claim 22, wherein the fourth face is formed by a curved surface.

30. The light source device of claim 22, wherein the fourth face is divided into a first face part close to the fifth face and a second face far from the fifth face, which interpose an inflection point therebetween, the first part is cylindrical-shaped so as to be concave toward the first face, and the second part is cylindrical-shaped so as to be convex toward the first face.

31. The light source device of claim 22, wherein the optical element further includes a sixth face opposed to the fifth face and having a rim formed by respective other side edges of the first to fourth faces.

* * * * *